US009882596B2

(12) United States Patent
Flores et al.

(10) Patent No.: US 9,882,596 B2
(45) Date of Patent: Jan. 30, 2018

(54) PROTECTIVE CASE FOR MOBILE ELECTRONIC COMMUNICATION DEVICE

(71) Applicant: Pelican Products, Inc., Torrance, CA (US)

(72) Inventors: Jesse Flores, Torrance, CA (US); Brendan Hingston Lake, Kennedy Town (HK); Daniel McLean, Adelaide (AU); Jiacai Li, Huizhou (CN)

(73) Assignee: Pelican Products, Inc., Torrance, CA (US)

( * ) Notice: Subject to any disclaimer, the term of this patent is extended or adjusted under 35 U.S.C. 154(b) by 0 days.

(21) Appl. No.: 14/964,352

(22) Filed: Dec. 9, 2015

(65) Prior Publication Data
US 2017/0054466 A1 Feb. 23, 2017

Related U.S. Application Data

(60) Provisional application No. 62/207,362, filed on Aug. 19, 2015, provisional application No. 62/210,944, filed on Aug. 27, 2015.

(51) Int. Cl.
*H04M 1/00* (2006.01)
*H04B 1/3888* (2015.01)
*G06F 1/16* (2006.01)
*H04M 1/04* (2006.01)
*H04M 1/18* (2006.01)

(52) U.S. Cl.
CPC ......... *H04B 1/3888* (2013.01); *G06F 1/1626* (2013.01); *G06F 1/1656* (2013.01); *H04M 1/04* (2013.01); *H04M 1/185* (2013.01); *G06F 2200/1633* (2013.01)

(58) Field of Classification Search
None
See application file for complete search history.

(56) References Cited

U.S. PATENT DOCUMENTS

| 6,614,722 | B2 | 9/2003 | Polany et al. |
| 6,954,405 | B2 | 10/2005 | Polany et al. |
| 7,263,032 | B2 | 8/2007 | Polany et al. |
| 7,663,879 | B2 | 2/2010 | Richardson et al. |
| 8,068,331 | B2 | 11/2011 | Sauers et al. |

(Continued)

FOREIGN PATENT DOCUMENTS

| EP | 2 779 599 | 9/2014 |
| JP | 2013-211844 A | 10/2013 |

(Continued)

OTHER PUBLICATIONS

US 7,535,779, 05/2009, Polany et al. (withdrawn)

(Continued)

*Primary Examiner* — Tuan A Tran
(74) *Attorney, Agent, or Firm* — Foley & Lardner LLP

(57) ABSTRACT

A protective case for a mobile electronic communication device includes a rear cover including a compressible member and a catch, the compressible member and the catch being spaced from each other to form an alcove; and a front cover including a rim configured to extend into the alcove, the rim having an inner surface configured to contact the compressible member and an outer surface opposite the inner surface configured to engage the catch.

29 Claims, 17 Drawing Sheets

(56) References Cited

U.S. PATENT DOCUMENTS

| | | | |
|---|---|---|---|
| 8,342,325 B2 * | 1/2013 | Rayner | G06F 1/1626 206/305 |
| 8,383,216 B1 | 2/2013 | Hynecek | |
| 8,393,466 B2 | 3/2013 | Rayner | |
| 8,526,180 B2 | 9/2013 | Rayner | |
| 8,531,824 B2 | 9/2013 | Rayner | |
| 8,531,834 B2 | 9/2013 | Rayner | |
| 8,564,950 B2 | 10/2013 | Rayner | |
| 8,570,737 B2 | 10/2013 | Rayner | |
| 8,708,142 B2 | 4/2014 | Rayner | |
| 8,888,004 B2 | 11/2014 | Setlak et al. | |
| 8,915,361 B2 | 12/2014 | Rayner | |
| 8,955,678 B2 * | 2/2015 | Murphy | B23P 19/00 206/320 |
| 9,559,739 B2 * | 1/2017 | Murphy | B23P 19/00 |
| 2010/0066026 A1 | 3/2010 | Garcia et al. | |
| 2012/0118773 A1 * | 5/2012 | Rayner | G06F 1/1626 206/320 |
| 2013/0146491 A1 * | 6/2013 | Ghali | G06F 1/1626 206/320 |
| 2013/0271902 A1 | 10/2013 | Lai et al. | |
| 2014/0054084 A1 | 2/2014 | Pan | |
| 2014/0152890 A1 | 6/2014 | Rayner | |
| 2014/0217862 A1 | 8/2014 | Rayner | |
| 2014/0217863 A1 | 8/2014 | Rayner | |

FOREIGN PATENT DOCUMENTS

| | | |
|---|---|---|
| JP | 2013-545173 A | 12/2013 |
| WO | WO-83/00673 | 3/1983 |
| WO | WO-2013/181644 | 12/2013 |

OTHER PUBLICATIONS

Canadian Examiner's Report dated Jun. 15, 2017, from application No. 2,939,130.

Australian Examination Report dated May 24, 2017, from application No. 2016216588.

Extended European Search Report dated Jan. 5, 2017, from related application No. 16184680.3.

Japanese Office Action dated Sep. 20, 2017, from application No. 2016-160471.

* cited by examiner

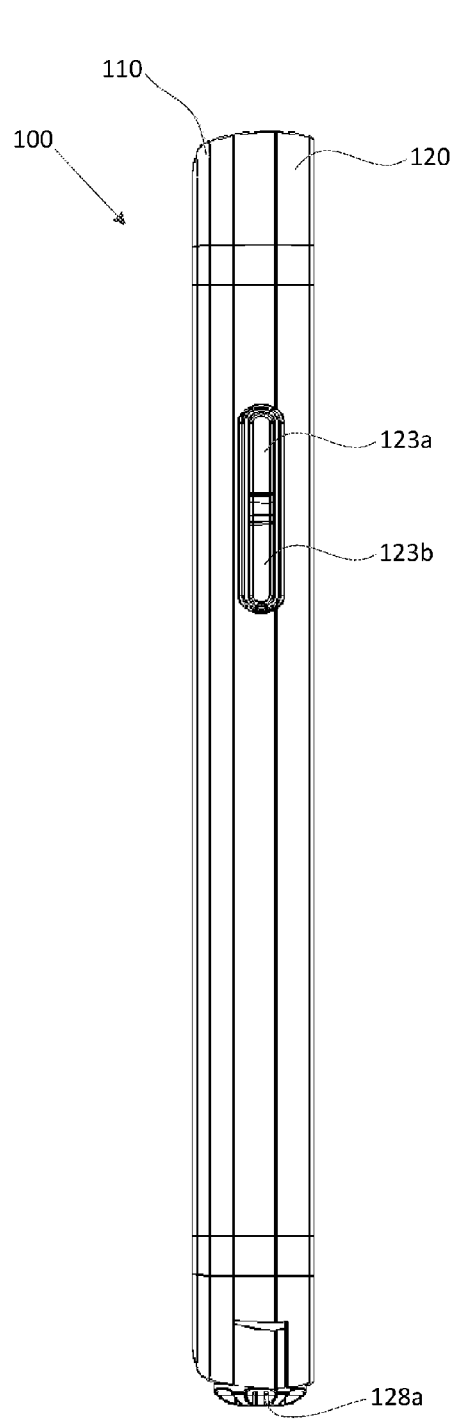
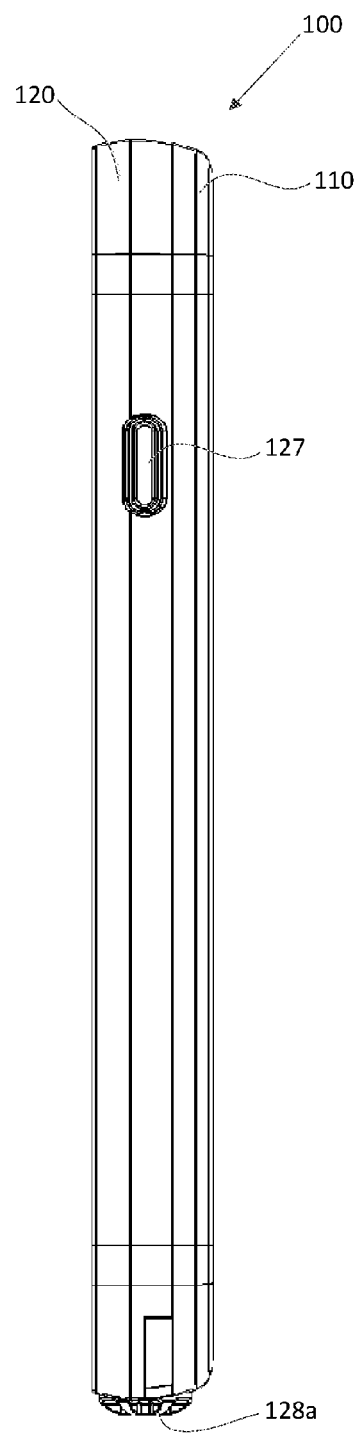
*FIGURE 2A*     *FIGURE 2B*

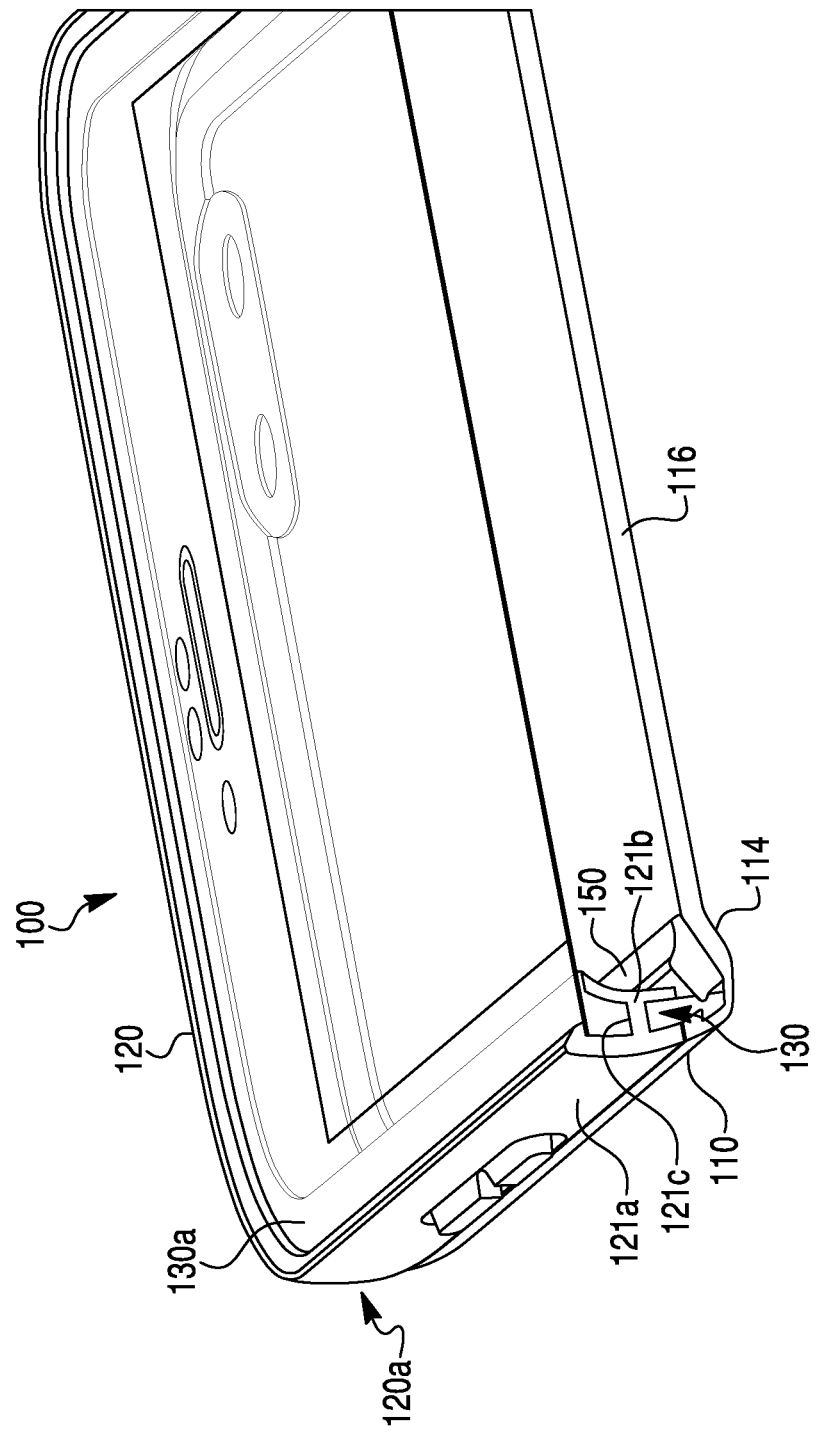

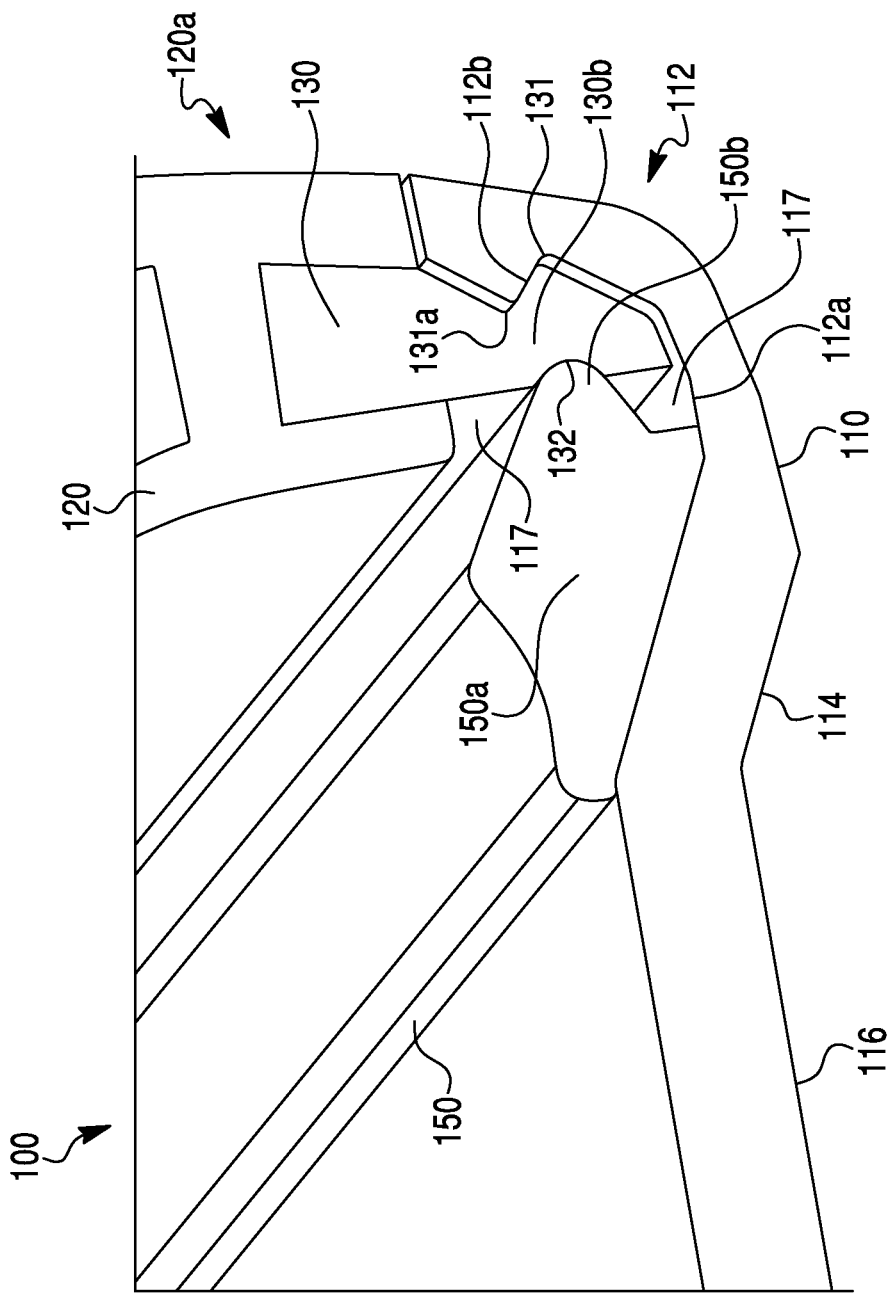

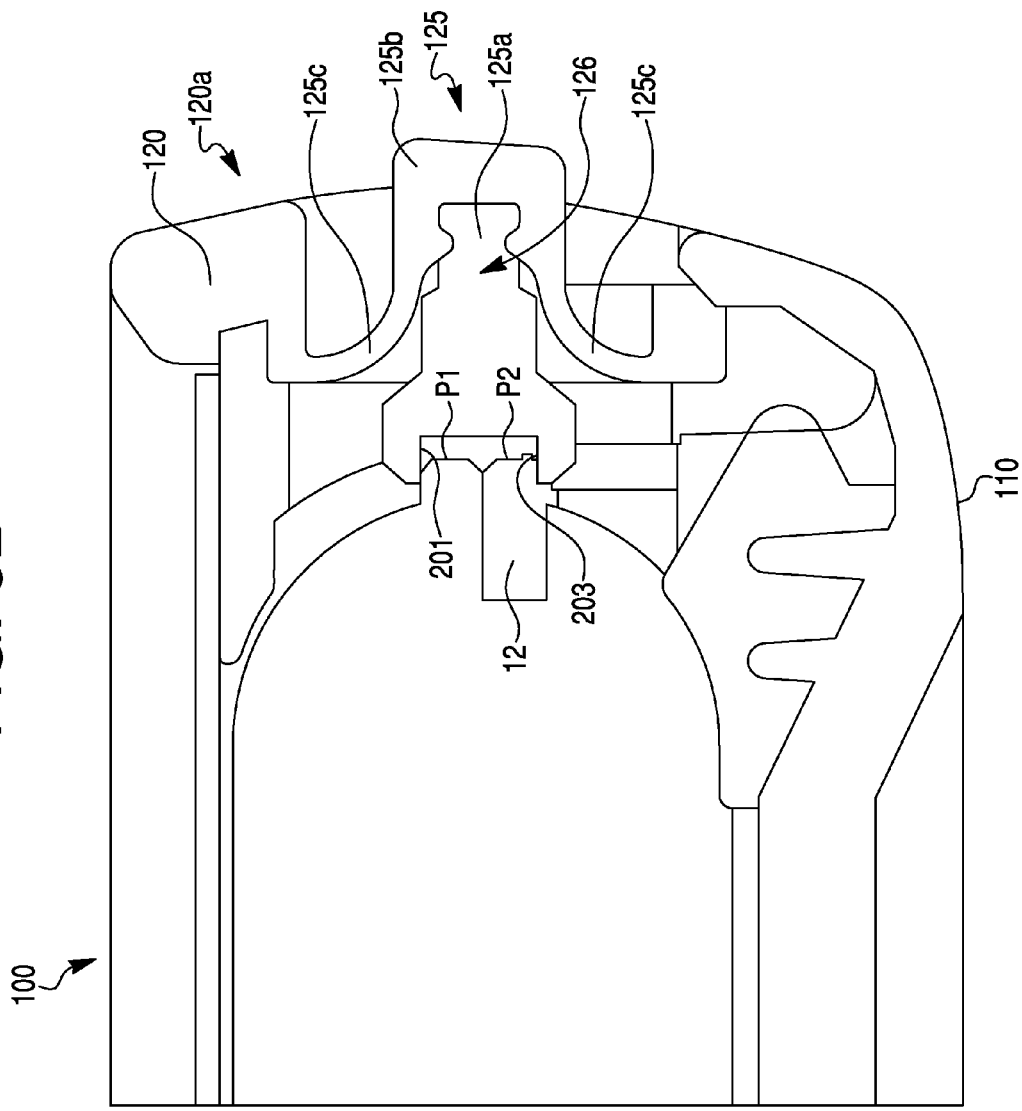

… (1) PROTECTIVE CASE FOR MOBILE ELECTRONIC COMMUNICATION DEVICE

CROSS-REFERENCE TO RELATED PATENT APPLICATIONS

The present application claims the benefit of U.S. Provisional Patent Application No. 62/207,362 filed on Aug. 19, 2015, the disclosure of which is expressly incorporated herein by reference in its entirety. This application also claims the benefit of U.S. Provisional Patent Application No. 62/210,944 filed on Aug. 27, 2015, the disclosure of which is expressly incorporated herein by reference in its entirety.

1. Field

The disclosure relates generally to cases and, in particular embodiments, to protective cases for mobile electronic communication devices.

2. Background

Mobile electronic communication devices, such as smart phones, tablets, or the like, typically contain sensitive and/or delicate electronics or other components. These devices can be subject to physical abuse and risks of damage from handling, especially given the portable nature of the devices (e.g., dropping, or otherwise subjecting the devices to physical shock or other trauma, etc.). In addition, because they contain sensitive electronics, mobile electronic communication devices are particularly susceptible to damage caused by liquids (e.g., a mobile phone may be rendered completely inoperable after being exposed to water). Mobile electronic communication devices typically include housings that can withstand a certain level of physical shock or water exposure. However, in an effort to improve aesthetics, the housings are typically designed to have finishes that look appealing, but often at the compromise of structural integrity. Accordingly, a protective case that encloses some or the entire mobile electronic communication device can provide an additional level of protection to the sensitive electronics and the housing of the mobile electronic communication device.

SUMMARY

Embodiments of the present disclosure relate to a protective case for a mobile electronic communication device having a user input interface.

According to various embodiments, there is provided a protective case for a mobile electronic communication device, the protective case including: a rear cover including a compressible member and a catch, the compressible member and the catch being spaced from each other to form an alcove; and a front cover including a rim configured to extend into the alcove, the rim having an inner surface configured to contact the compressible member and an outer surface opposite the inner surface configured to engage the catch.

In some embodiments, the outer surface of the rim has an angular recess.

In some embodiments, a shape of the catch corresponds to the angular recess of the outer surface of the rim for engagement between the catch and the angular recess.

In some embodiments, the inner surface of the rim has a flat surface.

In some embodiments, the compressible member includes an enlarged portion and a projection portion extending from the enlarged portion and into the alcove.

In some embodiments, the inner surface of the rim is configured to compress the projection portion of the compressible member when the rear cover is coupled to the front cover.

In some embodiments, the enlarged portion of the compressible member is configured to increase in thickness when the projection portion is compressed by the inner surface of the rim.

In some embodiments, the protective case further includes one or more empty spaces above and/or below the compressible member when the front cover is coupled to the rear cover, the empty spaces configured to accommodate the increased thickness of the enlarged portion of the compressible member.

In some embodiments, the rear cover has an inclined surface; and the compressible member is located on the inclined surface such that the compressible member is directed towards the alcove.

In some embodiments, the compressible member is made from liquid silicone rubber.

Further embodiments relate to methods of manufacturing a protective case for a mobile electronic communication device having a user input interface.

According to various embodiments, a method of manufacturing a protective case for a mobile electronic communication device includes providing a rear cover including a compressible member and a catch, the compressible member and the catch being spaced from each other to form an alcove; and configuring a front cover including a rim configured to extend into the alcove, the rim having an inner surface configured to contact the compressible member and an outer surface opposite the inner surface configured to engage the catch.

In some embodiments, the outer surface of the rim has an angular recess.

In some embodiments, a shape of the catch corresponds to the angular recess of the outer surface of the rim for engagement between the catch and the angular recess.

In some embodiments, the inner surface of the rim has a flat surface.

In some embodiments, the compressible member includes an enlarged portion and a projection portion extending from the enlarged portion and into the alcove.

In some embodiments, the inner surface of the rim is configured to compress the projection portion of the compressible member when the rear cover is coupled to the front cover.

In some embodiments, the enlarged portion of the compressible member is configured to increase in thickness when the projection portion is compressed by the inner surface of the rim.

In some embodiments, the method further includes providing one or more empty spaces above and/or below the compressible member when the front cover is coupled to the rear cover, the empty spaces configured to accommodate the increased thickness of the enlarged portion of the compressible member.

In some embodiments, the rear cover has an inclined surface; and the compressible member is located on the inclined surface such that the compressible member is directed towards the alcove.

In some embodiments, the compressible member is made from liquid silicone rubber.

BRIEF DESCRIPTION OF THE DRAWINGS

FIG. 2A is a side view of a protective case according to various embodiments.

FIG. 2B is another side view of a protective case according to various embodiments.

FIG. 5A is a perspective view of a portion of a protective case according to various embodiments.

FIG. 5B is a view of a portion of a protective case according to various embodiments.

FIG. 6B is a cross-section view of a portion of a protective case according to various embodiments.

DETAILED DESCRIPTION

Figure 1:
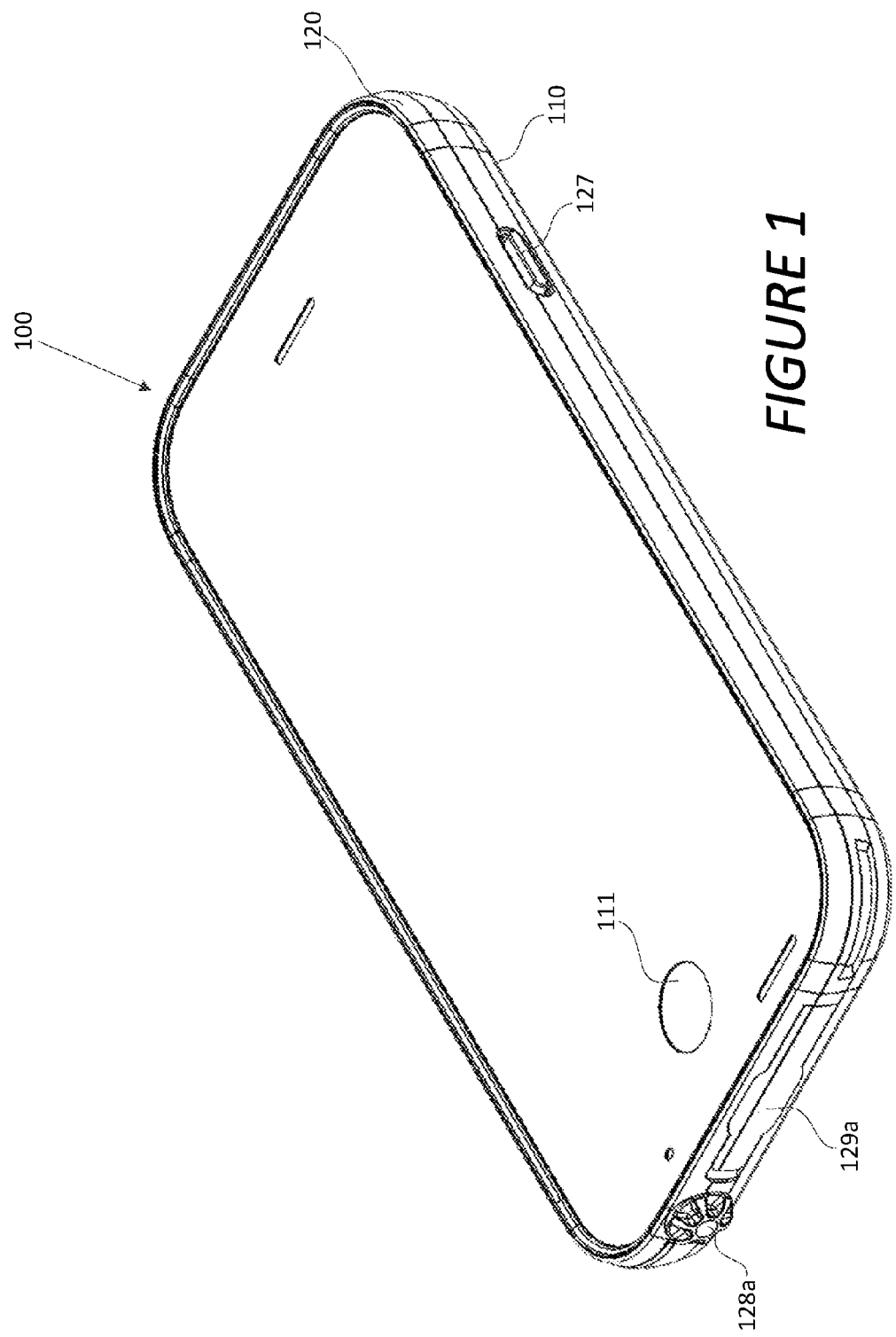
FIG. 1 is a perspective view of a protective case according to various embodiments.
Figure 2C:
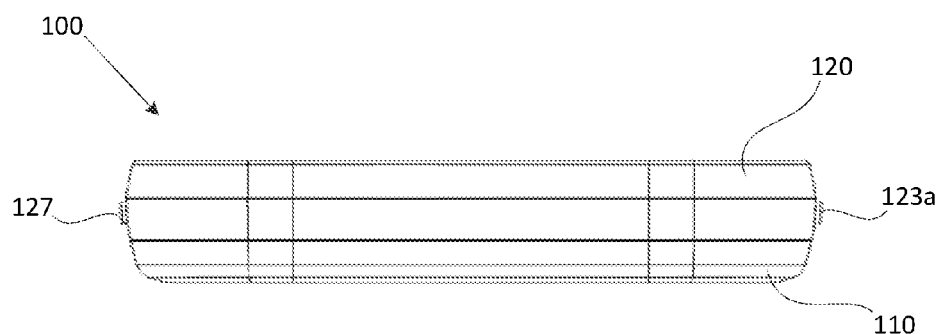
FIG. 2C is a top view of a protective case according to various embodiments.
Figure 2D:
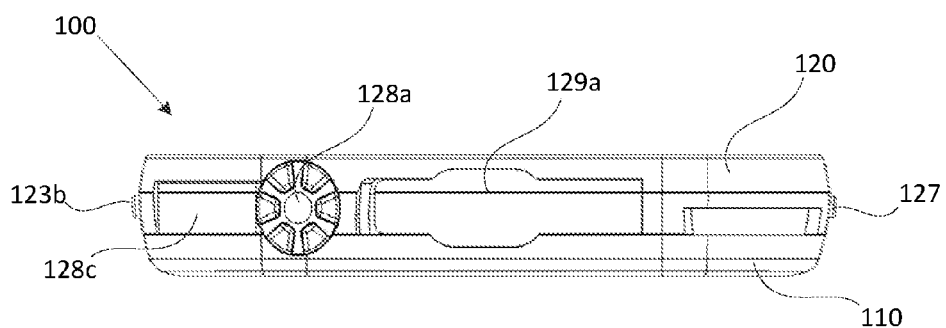
FIG. 2D is a bottom view of a protective case according to various embodiments.
Figure 3A:
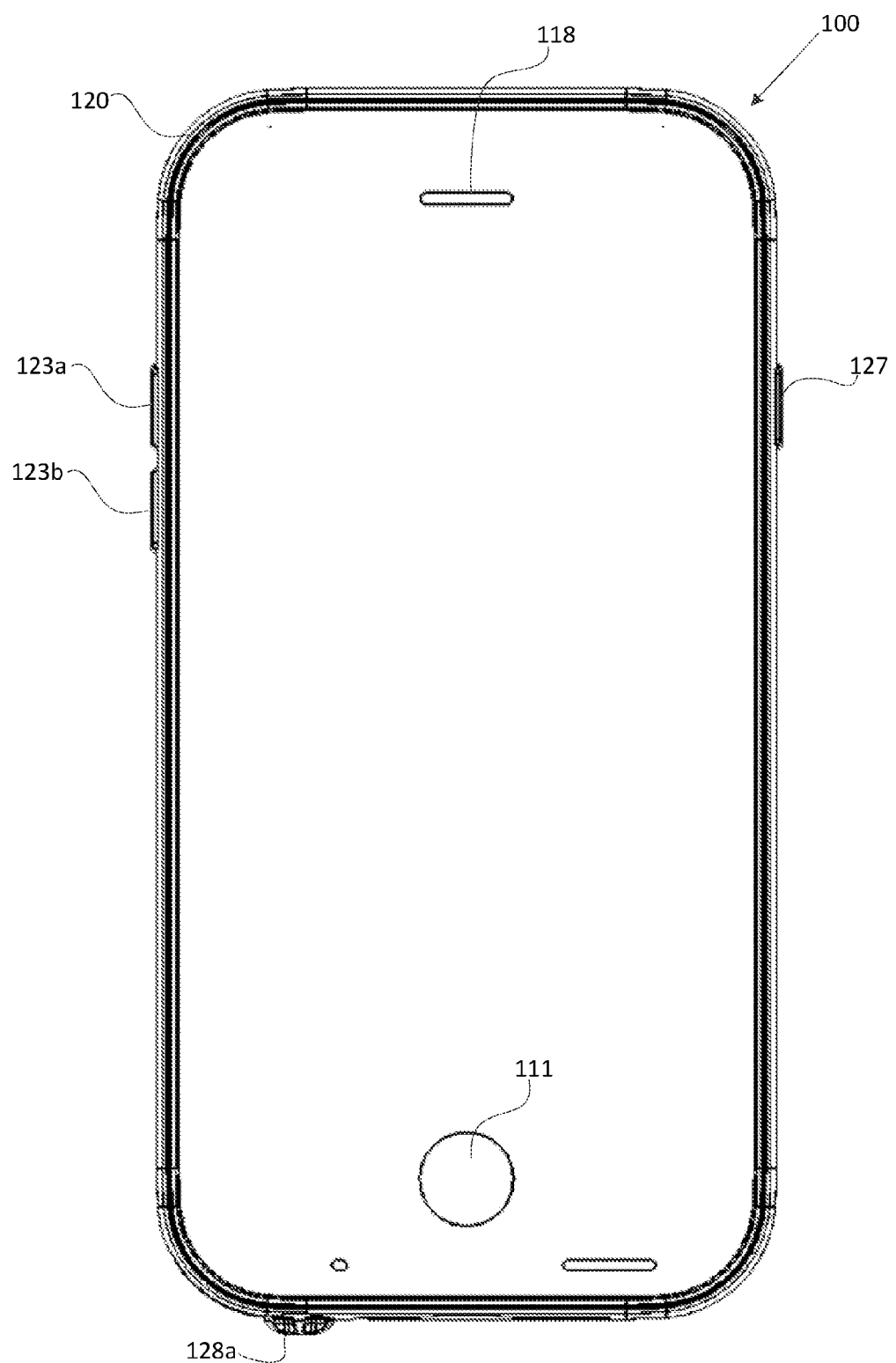
FIG. 3A is a view of a front cover of a protective case according to various embodiments.
Figure 3B:
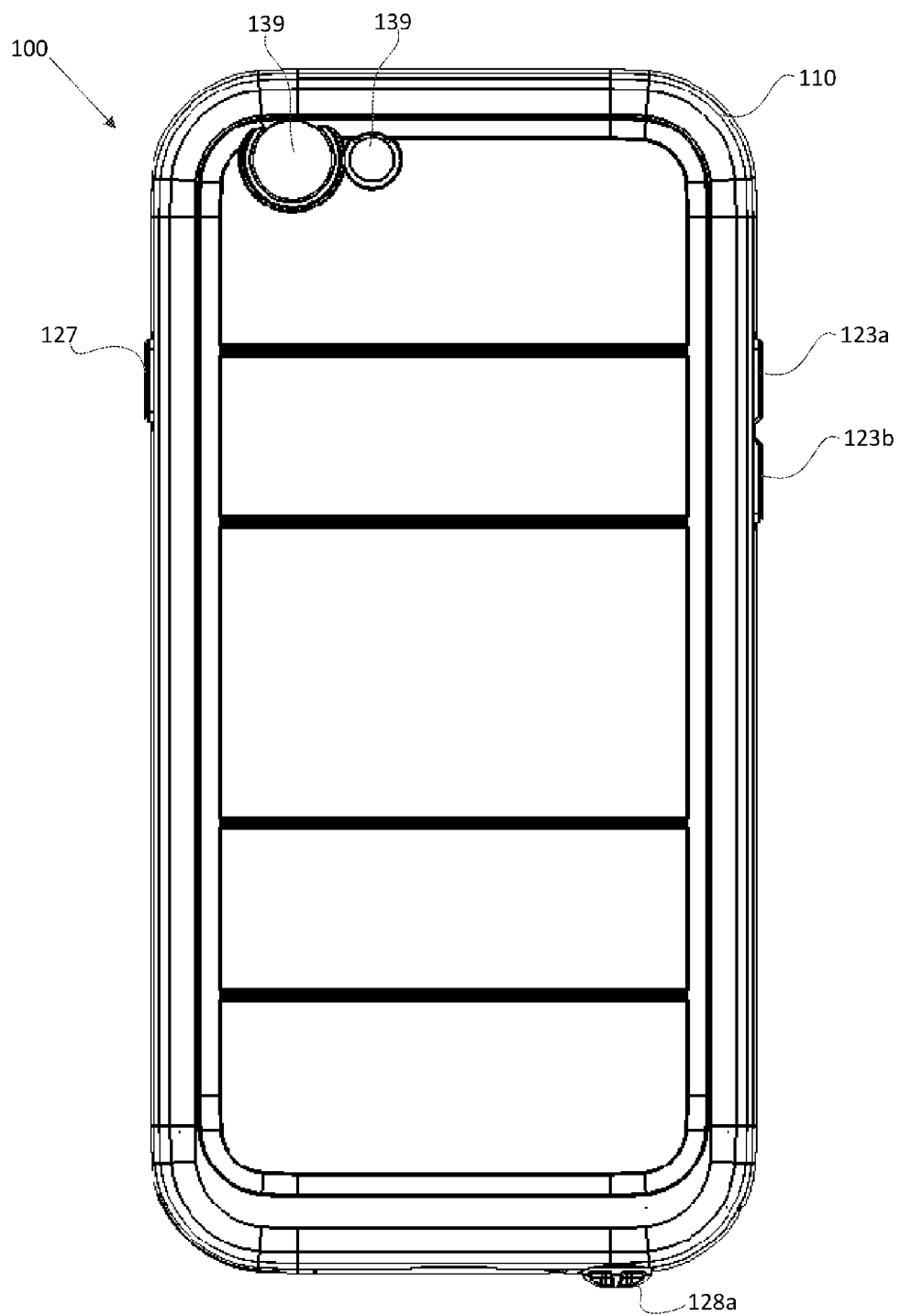
FIG. 3B is a view of a rear cover of a protective case according to various embodiments.
Figure 4:
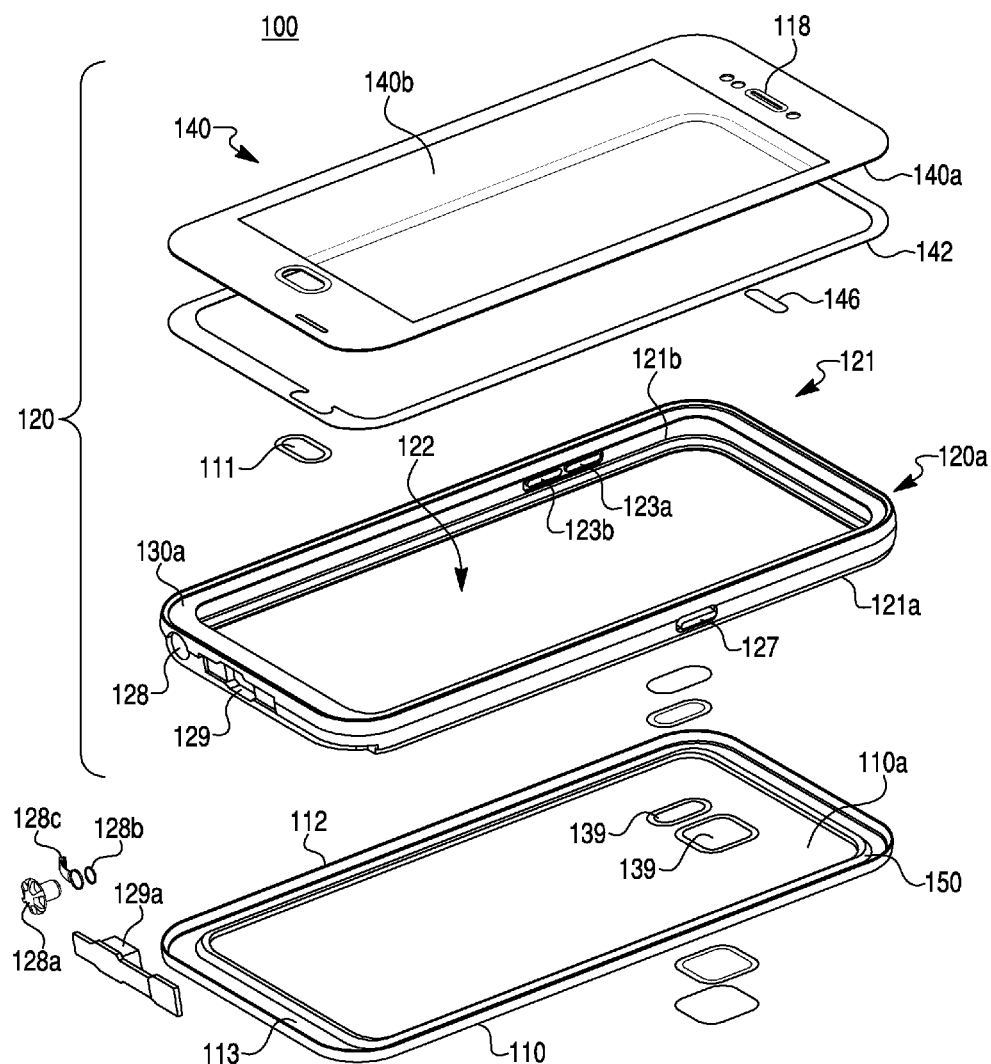
FIG. 4 is an exploded view of a protective case according to various embodiments.

FIG. 1 illustrates a protective case 100 for a mobile electronic communication device according to various embodiments. FIG. 2A is a side view of the protective case 100 according to various embodiments. FIG. 2B is another side view of the protective case 100 according to various embodiments. FIG. 2C is a top view of the protective case 100 according to various embodiments. FIG. 2D is a bottom view of the protective case 100 according to various embodiments. FIG. 3A is a view of a rear cover 110 of the protective case 100 according to various embodiments. FIG. 3B is a view of a front cover 120 of the protective case 100 according to various embodiments. FIG. 4 is an exploded view of the protective case 100 according to various embodiments. FIG. 5A is a perspective view of a portion of the protective case 100 according to various embodiments.

FIG. 5B is a view of a portion of the protective case 100 according to various embodiments.

Referring to FIGS. 1-5B, according to various embodiments, the protective case 100 includes the rear cover 110 and the front cover 120 that, when coupled, form a volume in the protective case 100. The volume of the protective case 100 may be configured to hold a mobile electronic communication device (not shown), such as, but not limited to, a smart phone (e.g., iPhone) or other cell phone, a tablet (e.g., iPad), a personal data assistant (PDA), a laptop, an MP3 player, a music player, a video player, a media player, a navigational device, a telematics devices, or any other portable electronic device. The mobile electronic communication device may include a display device (e.g., LCD screen, etc.), a user input interface (e.g., keyboard, touch-screen interface, etc.) for providing an input or otherwise interacting with the mobile electronic communication device, and/or the like. In particular embodiments, the mobile electronic communication device includes a touch-screen for the display device and the user input interface.

In various embodiments, the rear cover 110 and/or the front cover 120 may be made of any suitable material. In particular embodiments, the rear cover 110 and/or the front cover 120 may be made from materials that are capable of providing one or more of shock and liquid resistance to an encased mobile electronic communication device, when the rear cover 110 and the front cover 120 are coupled around the encased device. In some embodiments, the rear cover 110 and the front cover 120 are composed of a plurality of different components and therefore may be fabricated from a plurality of different materials. Suitable materials from which the rear cover 110 and/or the front cover 120 may be made of include, but are not limited to, rigid, semi-rigid, flexible, or any other type of material adapted to provide a corresponding desired amount of protection to the mobile electronic communication device (e.g., shock and/or liquid resistance) including, but not limited to, plastic, metal, polycarbonate, nylon, liquid crystal polymer, rubber, thermal plastic urethane, polyethylene, polypropylene, a combination thereof, a mixture thereof, and/or the like.

In various embodiments, the protective case 100 completely encloses the mobile electronic communication device. For instance, the rear cover 110 and the front cover 120, when coupled together, may completely enclose the mobile electronic communication device. In other embodiments, the protective case 100 covers a portion of the mobile electronic communication device. In such embodiments, a remaining portion of the mobile electronic communication device may remain exposed.

According to various embodiments, the front cover 120 includes an outer body 121. The outer body 121 may form the perimeter of the protective case 100 such that the outer body 121 encompasses the edges of a mobile device when the mobile device is encased in the protective case 100. The outer body 121 may include an outer peripheral wall 121a facing towards an outside of the protective case 100, and an inner peripheral wall 121b facing the opposite direction from which the outer peripheral wall 121a faces (e.g., towards the mobile electronic communication device when the device is encased in the protective case 100). The inner peripheral wall 121b may define a cavity 122 in which the mobile electronic communication device may reside. In such embodiments, the outer peripheral wall 121a and the inner peripheral wall 121b of the outer body 121 form a peripheral wall 120a of the front cover 120. In some embodiments, the outer peripheral wall 121a and the inner peripheral wall 121b are made from the same material. In other embodiments, the outer peripheral wall 121a and the inner peripheral wall 121b are made from different materials. The outer peripheral wall 121a and the inner peripheral wall 121b may be made from any suitable material for providing protection to the encased mobile electronic communication device, such as, but not limited to, an elastomeric material, plastic, metal, polycarbonate, nylon, liquid crystal polymer, rubber, thermal plastic urethane, polyethylene, polypropylene, a combination thereof, a mixture thereof, and/or the like.

In various embodiments, the outer body 121 of the front cover 120 further includes a liner 130 located between the outer peripheral wall 121b and the inner peripheral wall 121a. The liner 130 may extend along the perimeter of the peripheral wall 120a. In some embodiments, the outer peripheral wall 121a and the inner peripheral wall 121b may be coupled to each other by one or more channels 121c. Each of the one or more channels 121c may be located through the liner 130 to form a connection between the outer peripheral wall 121a and the inner peripheral wall 121b, which are otherwise isolated from each other by the liner 130. In some embodiments, each of the one or more channels 121c is periodically located throughout the perimeter of the liner 130, at discrete locations throughout the liner 130. In particular embodiments, the one or more channels 121c are arranged throughout the perimeter of the liner 130 in a regular or irregular pattern. In other embodiments, the one or more channels 121c include a continuous channel extending along the perimeter of the liner 130, as opposed to the one or more channels 121c being located at discrete locations, such that the outer peripheral wall 121a and the inner peripheral wall 121b are continuously coupled through the liner 130 along the perimeter of the outer body 121. The liner 130 may be made from any suitable sturdy material, such as, but not limited to, plastic, metal, polycarbonate, nylon, liquid crystal polymer, rubber, thermal plastic urethane, polyethylene, polypropylene, a combination thereof, a mixture thereof, and/or the like. In particular embodiments, the liner 130 and the peripheral wall 120a may be formed together (e.g., using an overmold process). In other embodiments, the peripheral wall 120a and the liner 130 are made separately and joined together.

In further embodiments, the liner 130 extends upward through a top perimeter (e.g., a location opposite the rear cover 110 when the front cover 120 and the rear cover 110 are coupled) of the outer body 121 and forms an annular ledge 130a of the liner 130 around the top perimeter of the outer body 121. The ledge 130a may be substantially flat along the top perimeter of the outer body 121 and extend inwards towards the cavity 122 and over the inner peripheral wall 121b. In some embodiments, the ledge 130a is formed as an extension of the liner 130 and may therefore be made from the same material as that of the liner 130. In other embodiments, the ledge 130a is formed separately and attached to the liner 130. In such embodiments, the ledge 130a may be formed of any suitable material the same as, or different from, the liner 130, such as, but not limited to, plastic, metal, polycarbonate, nylon, liquid crystal polymer, rubber, thermal plastic urethane, polyethylene, polypropylene, a combination thereof, a mixture thereof, and/or the like.

In further embodiments, the liner 130 also extends downwards through a bottom perimeter (e.g., a perimeter located opposite the annular ledge 130a) of the outer body 121 and forms an annular rim 130b of the liner 130 along the bottom perimeter of the outer body 121. In particular embodiments, the rim 130b extends beyond the peripheral wall 120a of the outer body 121. The rim 130b may include an outer surface 131 for engagement with the rear cover 110 and an inner surface 132 opposite the outer surface 131 for engagement with a seal located on the rear cover 110. In such embodiments, the outer surface 131 includes an angular recess 131a for engagement with the rear cover 110. Furthermore, the inner surface 132 may be a substantially flat or level surface. In some embodiments, the rim 130b is formed as an extension of the liner 130 and is therefore made from the same material as that of the liner 130. In other embodiments, the rim 130b is formed separately and attached to the liner 130. In such embodiments, the rim 130b may be formed of any suitable material the same as, or different from, the liner 130, such as, but not limited to, plastic, metal, polycarbonate, nylon, liquid crystal polymer, rubber, thermal plastic urethane, polyethylene, polypropylene, a combination thereof, a mixture thereof, and/or the like.

A mobile electronic communication device may be mounted or otherwise arranged in the protective case 100 in any suitable manner. In some embodiments, the mobile electronic communication device may be received in the front cover 120. For instance, the peripheral wall 120a defines the cavity 122 for receiving (at least a portion of) the mobile electronic communication device. In other embodiments, the mobile electronic communication device is mounted to the protective case 100 by attaching the mobile electronic communication device to the protective case 100, for example, with a fastener, adhesive, and/or the like.

In various embodiments, the rear cover 110 and the front cover 120 are configured to couple or mate in any suitable manner to enclose the mobile electronic communication device in the protective case 100. In particular embodiments, at least a portion of the rear cover 110 is received into a portion (e.g., cavity 122) of the front cover 120.

In some embodiments, the rear cover 110 and the front cover 120 are configured to be coupled together to form a waterproof seal (i.e., to substantially prevent passage of liquid from one side of the protective case 100 (e.g., outside of the protective case 100) to the other side of the protective case 100 (e.g., inside of the protective case 100)). In some embodiments, an annular compressible member 150 is provided on the rear cover 110 to provide a seal between the rear cover 110 and the front cover 120, when the rear cover 110 and the front cover 120 are coupled to each other. The annular compressible member 150 may extend along a perimeter (e.g., the entire perimeter or a portion of the perimeter) of the rear cover 110, at a location inwards from an edge 112 of the rear cover 110. In particular embodiments, the compressible member 150 is attached to a front surface 110a of the rear cover 110 facing the cavity 122. For instance, the compressible member 150 may be attached by, for example, but not limited to, overmolding the compressible member 150 onto the rear cover 110, an adhesive material, one or more fasteners, a combination thereof, and/or the like, to the front surface 110a or the rear cover 110. In various embodiments, the compressible member 150 is shaped and dimensioned to correspond to a shape and dimension of an outer perimeter of the mobile electronic communication device, or one or more portions of such outer perimeter. In some embodiments, the compressible member 150 may be a gasket (e.g., O-ring) or the like for providing a seal between the rear cover 110 and the front cover 120 when the rear cover 110 is coupled to the front cover 120. In particular embodiments, the compressible member 150 is made of a pliable material, such as, but not limited to, liquid silicone rubber (LSR), microcellular urethane (e.g., PORON®), and/or the like.

In some embodiments, the compressible member 150 may include an enlarged portion 150a and a projection portion 150b extending outwards from the enlarged portion 150a (e.g., towards the edge 112 of the rear cover 110). In some embodiments, the projection portion 150b extends into the alcove 113. In some embodiments, the rear cover 110 may include an inclined surface 114 around a perimeter of the rear cover 110 located inwards from the edge 112 of the rear cover 110. The location of the inclined surface 114 may substantially correspond to the enlarged portion 150a of the compressible member 150. In some embodiments, the enlarged portion 150a may have grooves for accommodating pillars that extend upwards from the inclined surface 114 (see e.g., FIG. 6B), for maintaining and stabilizing the compressible member 150. In further embodiments, the inclined surface 114 extends at a predefined angle for a predefined length along the rear cover 110. At the edge 112, the rear cover 110 may include a protruding surface 112a extending from the inclined surface 114 and substantially corresponding to the projection portion 150b of the compressible member 150. In some embodiments, the protruding surface 112a extends in a downward direction (e.g., in a direction opposite the encased mobile electronic communication device) such that the protective case 100, when lying flat, will stand and contact the surface on which it lays at the protruding surface 112a. Furthermore, because the protective case 100 may stand upright via the annular protruding surface 112a, there will be a volume of empty space present underneath the protective case 100, for example, substantially underneath a flat surface 116 extending from the inclined surface 114, opposite the protruding surface 112a. This volume of empty space allows for improved quality of sound and acoustics originating from the encased mobile electronic communication device.

In addition, in some embodiments, because the compressible member 150 is substantially located on the inclined surface 114 of the rear cover 110, this allows the pressure exerted by the compressible member 150 against the inner surface 132 of the rim 130b to be directed or focused downwards and towards the rim 130b, resulting in a stronger seal. Furthermore, in some embodiments, the compressible member 150 takes the form of a ring around the perimeter of the rear cover 120, which protrudes upwards towards the front cover 120 above the front surface 110a of the rear cover 110. Accordingly, in some embodiments, the mobile electronic communication device, when resting atop the rear cover 110 will be suspended above the front surface 110a of the rear cover 110, such that there will be a gap of empty space underneath the device when inside the protective case. By accommodating for a space or gap between the mobile electronic communication device and the front surface 110a of the rear cover 110, the protective case 100 allows for improved sound quality and acoustics originating from the encased mobile electronic communication device.

In further embodiments, the projection portion 150b of the compressible member 150 contacts (e.g., engages or abuts) the inner surface 132 of the rim 130b of the front cover 120 to form a seal between the compressible member 150 and the inner surface 132 of the rim 130b of the front cover 120 when the rear cover 110 and the front cover 120 are coupled to each other. In such embodiments, when the rear cover 110 and the front cover 120 are not coupled to each other (e.g., they are separated), the rear cover 110 may include an alcove 113 between the compressible member 150 and the edge 120 for accommodating the rim 130b. The alcove 113 may have enough space for allowing the rim 130b to both clasp with the rear cover 110 (at one side of the rim 130b at the outer surface 131) and compress the compressible member 150 for sealing (at the opposite side of the rim 130b at the inner surface 132). In such embodiments, the compressible member 150 compresses away from the inner surface 132 of the rim 130b towards the enlarged portion 150a (e.g., up the inclined surface 114) such that the projection portion 150b is in a state that is flush (e.g., compressed) against the inner surface 132 of the rim 130b. Accordingly, the excess material of the compressible member 150 that is compressed up the inclined surface 114 may transfer to the enlarged portion 150a of the compressible member 150 and increase the thickness of the enlarged portion 150a. In such embodiments, when the rear cover 110 and the front cover 120 are coupled to each other, there may be provided at least one empty space 117 above and/or below the compressible member 150 such that the transferred material of the compressible member 150, when the compressible member 150 is in a compressed state, may be accommodated within the protective case 100. By exerting force against the compressible member 150 such that it is in a compressed state, the seal strength may be increased to further inhibit passage of fluid, dust, or the like, between the compressible member 150 and the front cover 120. According to various embodiments, when the front cover 110 and the rear cover 120 are coupled together, an enclosed volume is formed for holding the mobile electronic communication device. In some embodiments, the compressible member 150 may be made from liquid silicone rubber, which may provide improved memory characteristics for maintaining the seal of the protective case 100.

In further embodiments, while the inner surface 132 of the rim 130b is configured to interact or engage with the compressible member 150 for sealing the protective case 100, the outer surface 131 of the rim 130b may be configured to interact or engage with the rear cover 110 to fasten or clasp the front cover 120 together with the rear cover 110. In some embodiments, the edge 112 of the rear cover 110 includes a catch 112b. The catch 112b may correspond to a shape of the angular recess 131a at the outer surface 131 of the rim 130a such that the angular recess 131a and the catch 112b interlock with each other to secure the coupling of the rear cover 110 with the front cover 120. In various embodiments, when the front cover 120 is not coupled to the rear cover 110, there may be an alcove 113 between the compressible member 150 and the catch 112b for accommodating the rim 130b when the front cover 120 is coupled to the rear cover 110. In other words, the compressible member 150 and the catch 112b may be spaced from each other to form the alcove 113, which is configured to accommodate the rim 130b. It should be noted that such coupling configurations for the rear cover 110 and the front cover 120 are examples, and other embodiments may implement other suitable coupling configurations, such as, but not limited to, different corresponding angles and/or shapes of the angular recess 131a and the catch 112b (e.g., male and female plugs), other coupling mechanisms (e.g., friction fitting, snap fitting, clasping mechanism, clamping/fastening member, and/or the like), etc. In further embodiments, the coupling locations between the rear cover 110 and the front cover 120 may be discrete and periodic along the perimeter of the protective case 100, instead of a continuous system throughout the perimeter.

In yet further embodiments, the inner surface 132 and the outer surface 131 of the rim 130b may be designed differently from each other, as they provide different functions (e.g., the inner surface 131 is configured to seal against the compressible member 150 and the outer surface is configured to clasp and engage the rear cover 110 for latching the front cover 120 and the rear cover 110 together). As such, in some embodiments, the inner surface 132 may have a smooth and level shape (e.g., flat), so as to not be abrasive against the compressible member, and the outer surface 131 may have a more contoured shape (e.g., jagged or angular shape) for suitably latching and maintaining the connection to the catch 112*b* of the rear cover 110.

According to some embodiments, the front cover 120 includes a membrane 140 that allows access to the front surface of the mobile electronic communication device, such as the user input interface (e.g., touchscreen interface) of the mobile electronic communication device, one or more of the operators, and/or the like of the mobile electronic communication device, through the membrane 140 provided over at least a portion of the mobile electronic communication device. In some embodiments, the membrane 140 includes at least one aperture 118 (or otherwise provides access) for allowing access to at least one other portion of the mobile electronic communication device, such as, but not limited to, one or more of a front-facing camera, microphone, speaker, proximity sensor, etc.

In particular embodiments, the rear cover 110 and the front cover 120, when coupled together, along with the membrane 140, completely enclose the mobile electronic communication device. The membrane 140 may be a sheet of thin plastic or other suitable material, for example, that allows interaction with an encased mobile electronic communication device (e.g., the touchscreen display of the encased mobile electronic communication device). The membrane 140 may be transparent (or at least partially transparent) to allow images displayed on the touchscreen display of the mobile electronic communication device to be visible through the membrane 140. The configuration (e.g., size, thickness, layout, composition etc.) of the membrane 140 may be based on a particular manufacturer or model of the encased mobile electronic communication device.

According to various embodiments, the membrane 140 is fixed by, for example, but not limited to, adhesive, surface tension, friction, static cling, viscous fluid, one or more fasteners, a combination thereof, and/or the like, to one or more of the protective case 100 (e.g., the front cover 110, the rear cover 120, etc.) or the mobile electronic communication device. In some embodiments, the membrane 140 is affixed to the annular ledge 130*a*. In such embodiments, the membrane 140 may be affixed to the ledge 130*a* via an annular fastener 142 disposed between the membrane 140 and the annular ledge 130*a*. In various embodiments, the annular fastener 142 may be any suitable material for securing the membrane 140 to the annular edge 130*a*, such as, but not limited to, double-sided tape, pad print adhesive, and/or the like. By affixing the membrane 140 on top of the outer body 121 (e.g., as opposed from the bottom of the outer body 121 within the cavity 122), the membrane 140 may be more uniformly and easily affixed at the annular fastener 142 during a manufacturing process of the protective case 100 (e.g., by a roller machine configured to apply uniform pressure throughout the perimeter of the membrane at the annular fastener 142). In other embodiments, the membrane 140 is not fixed to the protective case 100 or the mobile electronic communication device. That is, the membrane 140 may be a separate component from the rear cover 110 and the front cover 120. In such embodiments, the membrane 140 may be held in place against the mobile electronic communication device by coupling (e.g., clamping, fastening, adhesive, etc.).

In various embodiments, the membrane 140 is located over the front surface of the mobile electronic communication device received in the protective case 100 and rests on the front surface of the mobile electronic communication device to allow user interaction with the user input interface of the mobile electronic communication device through the membrane 140. In particular embodiments, a rear surface 140*a* (the surface facing downwards in the orientation of FIG. 4) of the membrane 140 is arranged to contact the front surface of the encased mobile electronic communication device. According to various embodiments, the membrane 140 may be made of any suitable transparent and lightweight material, such as, but not limited to, glass, plastic, vinyl, and/or the like.

The mobile electronic communication device may include at least one camera or other video/image/data capture device. In particular embodiments, the protective case 100 is configured to allow an image or the like to be captured through the protective case 100. In particular embodiments, the rear cover 110 includes one or more openings 139 arranged to align with a lens of a rear-facing camera and/or a light source (e.g., for providing flash photography in conjunction with the rear-facing camera) of the mobile electronic communication device. In further embodiments, the one or more openings 139 is covered by a transparent portion (e.g., an optically clear lens) arranged to align with the camera lens, the light source, and/or the like. The transparent portion may be formed as an integral feature of the protective case 100 or may be a separate part formed separately and assembled to the protective case 100. In some embodiments, the protective case 100 includes a movable door arranged over the lens to selectively open to allow the camera to capture an image of an object outside the protective case 100. In some embodiments, the front cover 120 may be configured to allow an image or the like to be captured through the protective case 100 by a front-facing camera. For example, the front cover 110 may include an aperture or otherwise provide access to the front-facing camera of the mobile electronic communication device (e.g., through the transparent membrane 140 itself). In further embodiments, the one or more openings 139 and/or the aperture for the front-facing camera may be surrounded by a gasket (e.g., O-ring) or the like for providing a seal at the openings and/or aperture. In particular embodiments, the gasket is made of a pliable material, such as, but not limited to, liquid silicone rubber, microcellular urethane (e.g., PORON®), and/or the like.

The mobile electronic communication device may have one or more indicator lights on one or more suitable portions of the mobile electronic communication device to indicate information, such as a status light for power, communication, battery status, or other functions (e.g., new voicemail, email, text message, or other message). In some embodiments, the indicator lights may be in positions on the mobile electronic communication device that are not readily viewable through the membrane 140 or other portion of the protective case 100. In particular embodiments, the protective case 100 may be configured to allow the indicator lights to be visible through at least a portion of the protective case 100. For example, the rear cover 110 and/or the front cover 120 of the protective case 100 may include one or more transparent portions, light pipes, or the like that transmit light from the mobile electronic communication device to outside of the protective case 100. The transparent portions may be constructed of a transparent (or semi-transparent) material. The transparent portions may be formed as an integral feature of the protective case 100 or may be separate parts that are formed separately and assembled to the protective case 100. In other embodiments, the indicator lights of the mobile electronic communication device are visible to outside of the protective case 100 through the membrane 140 itself. According to various embodiments, the transparent portions may be made of any suitable transparent material, such as, but not limited to, glass, plastic, vinyl, and/or the like.

The mobile electronic communication device may further include one or more audio devices, such as speakers, headphone jacks, microphones for receiving audio signals, etc. In particular embodiments, the protective case 100 may be configured to transmit audio signals through the protective case 100 to/from the one or more of the audio devices. For example, the rear cover 110 and/or the front cover 120 of the protective case 100 may include one or more openings 128 to the one or more of the audio devices. In further embodiments, the opening 128 includes a plug 128a to selectively open to allow access to the opening 128 for the speaker, microphone jack, and/or the like. In particular embodiments, the plug 128a is configured to pivot, slide, hinge, or open in any suitable manner that allows access to the opening 128. In some embodiments, the plug 128 may include an annular gasket 128b (e.g., O-ring) configured to surround a portion of the plug. The gasket 128b may be configured to seal (e.g., from liquid) the opening 128 when the plug 128a is situated within the opening 128. In some embodiments, the plug 128a has a threaded screw-like extension corresponding to the threaded opening 128, such that the plug 128a may be rotated into the opening for providing additional sealing and protection to the encased electronic mobile communication device. In other embodiments, the plug 128a is not threaded, but is configured to tightly fit in the opening 128 for suitably sealing the opening 128. In further embodiments, the plug 128a is fastened to the protective case 100 by a tether 128c. The tether 128c may be made from any suitable material for securing the tether 128c to the protective case 100, such as, a rigid material (e.g., plastic, polycarbonate, etc.) or a non-rigid material (e.g., string, fabric, rubber, etc.).

In other embodiments, the protective case 100 includes a film, membrane, or other material adapted to allow sound to pass through the film to or from one or more of the audio devices, yet inhibit passage of fluid, dust, or the like to the audio devices. For example, the membrane 140 includes the at least one aperture 118 over a speaker of the mobile electronic communication device. A film 146 may be provided over the at least one aperture 118 to allow sound to pass through the at least one aperture 118 and the film 146. In some embodiments, the film 146 is attached (e.g., via an adhesive, fastener, etc.) to a rear surface 140a of the membrane 140. In such embodiments, the film 146 is arranged between the mobile electronic communication device and the membrane 140. In other embodiments, the film 146 is attached to a front surface 140b of the membrane 140. In other embodiments, the film 146 is an integral part of the membrane 140. In some embodiments, the film 146 is configured to inhibit or prevent liquid, dust, and/or the like from penetrating the protective case 100 at the at least one aperture 118. According to various embodiments, the film 146 may be made of any suitable light material for protecting the sensitive electronics of the encased mobile device, such as, but not limited to, a hydrophobic polymer, and/or the like.

The mobile electronic communication device may have at least one interface for communicating with another device (e.g., a computer, a speaker, a charging device, etc.) and/or for charging the mobile electronic communication device. The interface may be a direct electrical connection, such as through a cable, for example (but not limited to) a USB cable and/or the like. Alternatively, or in addition, the interface may be a wireless connection, for example (but not limited to) Wi-Fi, Bluetooth, and/or the like. In particular embodiments, the protective case 100 may be configured to allow access to one or more of the interfaces, such as an interface that allows for a direct electrical connection. For example, the protective case 100 may include an interface opening 129 that aligns with the interface of the mobile electronic communication device when the mobile electronic communication device is received in the cavity 122 of the protective case 100. In further embodiments, the interface opening 129 may include a door 129a or the like for allowing selective access to the interface opening 129 to the interface of the mobile electronic communication device. In particular embodiments, the door 129a is configured to pivot, slide, hinge, or open in any suitable manner that allows access to the opening 129. The door may be made from any suitable material for adequately sealing the opening 129, such as, but not limited to, rubber, plastic, etc.

The mobile electronic communication device may include one or more operators (e.g., buttons, switches, etc.) as part of the user input interface for the mobile electronic communication device. The operator(s) may provide various functions, such as, but not limited to, powering on/off the mobile electronic communication device, changing a volume of the mobile electronic communication device, toggling audio/vibration (e.g., ringer of the mobile electronic communication device), or performing other functions on the mobile electronic communication device (e.g., a "Home" button). The button sizes, quantity, layouts, and functions may vary for each manufacturer and model of the mobile electronic communication device.

As such, in various embodiments, the protective case 100 may be configured to allow actuation of one or more operators of the mobile electronic communication device while the mobile electronic communication device is encased in the protective case 100. For instance, the protective case 100 may include one or more members or other features that are arranged to interact with one or more of the mobile electronic communication device operators. In some embodiments, a moveable member may be provided on the protective case 100 at a position to interact with the one or more operators of the mobile electronic communication device (received in the cavity 122) to transmit mechanical motion from outside of the protective case 100 to the one or more operators of the mobile electronic communication device. In particular embodiments, the moveable member may be a flexible or pliable member or portion of the protective case 100.

In one embodiment, the moveable member may include a flexible member 111, which may be arranged in the front cover 120 to transmit a force applied to the flexible member 111 to a Home button of the mobile electronic communication device located on a front surface of the mobile electronic communication device. In some embodiments, the flexible member 111 is also configured to allow sensing electronics of the mobile electronic communication device, beneath the flexible member 111, to sense characteristics beyond the flexible member. For example, the sensing electronics may include a biometric scanner for scanning and recognizing a fingerprint of a user, and the flexible member 111 may be configured to substantially allow the fingerprint scanner to function through the flexible member 111. In particular embodiments, the flexible member 111 may be suitably thin to allow the sensing electronics to properly function. According to various embodiments, the flexible member 111 may be made of any suitable flexible material, such as, but not limited to, liquid silicone rubber (LSR), microcellular urethane (e.g., PORON®), and/or the like.

In some embodiments, the moveable member may be a moveable body, such as a plunger or the like, configured to transmit mechanical movement from outside of the protective case 100 to one or more of the operators of the mobile electronic communication device. For example, a plunger 127 may be provided in the front cover 120 to transmit a force applied to the plunger 127 to a power or sleep/wake button of the mobile electronic communication device. As another example, a first button plunger 123a (e.g., corresponding to a volume up button of the mobile electronic communication device) and a second button plunger 123b (e.g., corresponding to a volume down button of the mobile electronic communication device) may be provided in the front cover 120 to transmit a force, applied to the first button plunger 123a or the second button plunger 123b, to the volume up button or volume down button of the mobile electronic communication device. Thus, in various embodiments, movement of a feature of the protective case 100 may move in a same (or parallel) direction as a direction in which a corresponding operator of the mobile electronic communication device is moved. According to various embodiments, the button plungers may be made of any suitable flexible or pliable material, such as, but not limited to, liquid silicone rubber (LSR), microcellular urethane (e.g., PORON®), and/or the like.

In other embodiments, the protective case 100 is configured to provide access to one or more of the mobile electronic communication device operators. For example, the protective case 100 may include an opening to allow a user to access (e.g., actuate) one or more of the mobile electronic communication device operators. It should be noted that the mobile electronic communication device may include any suitable type or number of operators, and/or the protective case 100 may include any suitable type or number of members arranged to interact with such operators. For example, the protective case 100 may include a pivoting or rocking member for actuating (at least) two of the operators (e.g., the volume up button and volume down button) of the mobile electronic communication device.

Figure 6A:
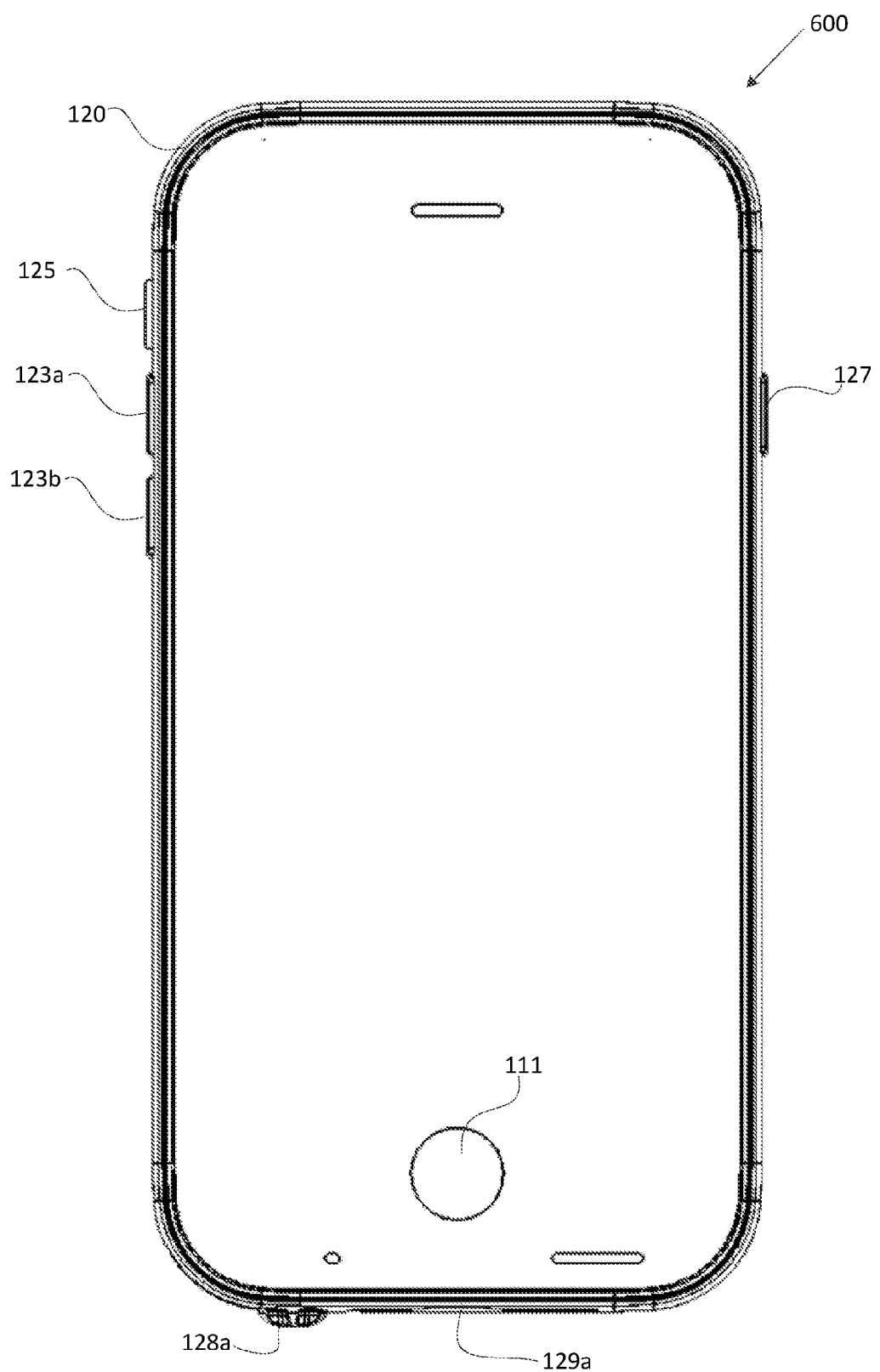
FIG. 6A is a view of a front cover of another protective case according to various embodiments.

FIG. 6A is a view of a front cover of another protective case 600 according to various embodiments. FIG. 6B is a cross-section view of a portion of the protective case 600 according to various embodiments.

Referring to FIGS. 1-6B, in some embodiments, the protective case 600 may be configured to allow actuation of one or more switches of the mobile electronic communication device while the mobile electronic communication device is encased in the protective case 600. For instance, the protective case 600 may include one or more members or other features that are arranged to interact with one or more of the mobile electronic communication device switches. In some embodiments, a moveable member may be provided on the protective case 600 at a position to interact with the one or more switches of the mobile electronic communication device (received in the cavity 122) to transmit mechanical motion from outside of the protective case 600 to the one or more switches of the mobile electronic communication device. In particular embodiments, the moveable member may be a rigid laterally movable switch of the protective case 100. For example, at least one switch 125 may be arranged in the front cover 120 to transmit a force applied to the at least one switch 125 to a switch of the mobile electronic communication device located on a side surface of the mobile electronic communication device.

In some embodiments, the protective case 100 includes the at least one switch 125 configured to transmit mechanical movement to a corresponding operator of the mobile electronic communication device, such as, but not limited to, an audio/vibration (AV) switch 12. The switch 125 may be located in correspondence with the AV switch 12 of the mobile electronic communication device. For example, the switch 125 may be located at the same side of the outer body 121 as the button plungers 123a and 123b are located, and may be proximate the button plungers 123a and 123b. In some embodiments, the switch 125 may be configured for linear movement relative to a linear dimension (e.g., height dimension) of the mobile electronic communication device. In other embodiments, the switch 125 may be configured to pivot about an axis to interact with a switch of the mobile communication device. For instance, the AV switch 12 may be configured for movement in a first direction (e.g., toward a front surface of the mobile electronic communication device) to a first position P1, which provides a first state (e.g., "ON"), and a second direction (e.g., toward a rear surface of the mobile electronic communication device) opposite the first direction to a second position P2, which provides a second state (e.g., "OFF").

In various embodiments, the switch 125 includes an actuator 125a configured to actuate the AV switch 12 (at least) between the first position P1 and the second position P2. The actuator 125a may be encompassed by a layer of flexible material 125b that protrudes outside of the protective case. In some embodiments, the layer of flexible material 125b forms a recess for receiving the actuator 125a. A user may interact with the a layer of flexible material 125b to move the actuator 125a. The switch 125 may be provided in an opening through the peripheral wall 120a of the front cover 120 to allow the actuator 125a to engage the AV switch 12 of the mobile electronic communication device when the mobile electronic communication device is received in the protective case 100. In some embodiments, the switch 125 may be formed with the peripheral wall 120a (e.g., the switch 125, or the layer of flexible material 125b, and the peripheral wall 120a may be formed by overmolding together). In further embodiments, the switch 125 may be formed with an undercut 126 for receiving the actuator 125a such that the layer of flexible material 125b encompasses the actuator 125a. In some embodiments, the actuator 125a snap fits or pushes into the undercut 126 of the switch 125. The actuator 125a may be formed separately from the remainder of the switch 125 and later affixed to the undercut 126 of the switch 125, or the actuator may be formed with the switch 125 as one piece. In some embodiments, the actuator 125 may be formed by injection molding. In further embodiments, the actuator 125 may be formed of any suitable material for engaging with the AV switch 12, such as, but not limited to, nylon, acrylonitrile butadiene styrene (ABS), and/or the like. Thus, the switch 125 may be slidably movable relative to the front cover 120 (or other suitable portion of the protective case 100) along an axis that is parallel to the dimension along which the AV switch moves. In other embodiments, the switch 125 may pivot or rotate along an axis that is orthogonal to the dimension along which the AV switch moves (e.g., a rocking switch), for actuating the AV switch. In particular embodiments, the actuator 125a may not extend beyond the outer edge of the peripheral wall 120a (e.g., the actuator 125a may extend out to before the outer edge or to the outer edge). In one embodiment, the peripheral wall 120a is a single overmolded layer that extends in a rectangular perimeter and provides cushioning to an encased mobile electronic communication device, while also sealing the openings corresponding to switches and buttons of the device (e.g., with the switch 125). In other embodiments, the peripheral wall 120a includes a plurality of discrete pieces melded together to form the wall 120a (e.g., a top portion of the wall 120a may be separately formed from a side portion of the wall 120a).

In some embodiments, the actuator 125a includes a first engagement surface 201 and a second engagement surface 203 that selectively engages the AV switch 12 as the switch 125 is moved. After engagement between the AV switch 12 and the first engagement surface 201 or the second engagement surface 203, further movement of the switch 125 causes the engaged surface 201, 203 of the actuator 125a to push or otherwise move the AV switch 12 in a corresponding direction.

Accordingly, in particular embodiments, the actuator 125a is configured such that the first engagement surface 201 causes the AV switch 12 to move in the second direction from the first state (e.g., "ON", P1) to the second state (e.g., "OFF", P2) when the switch 125 is shifted in the second direction. In addition, the actuator 125a is configured such that the second engagement surface 203 causes the AV switch 12 to move in the first direction from the second state ("P2") to the first state ("P1") when the switch 125 is shifted in the first direction.

In some embodiments, the switch 125 is configured to be movable in the first direction (at least) until the AV switch 12 reaches the first position P1, at which the AV switch 12 is in the first state (e.g., "ON"). In further embodiments, the switch 125 is configured to be movable in the second direction (at least) until the AV switch 12 reaches the second position P2, at which the AV switch 12 is in the second state (e.g., "OFF").

In other embodiments, instead of shifting linearly, the switch 125 is configured to be statically maintained in the protective case 600 and to pivot upward and downward about an axis that is orthogonal to the dimension along which the AV switch shifts. In such embodiments, the actuator 125a is configured such that the first engagement surface 201 causes the AV switch 12 to move in the second direction from the first state (e.g., "ON", P1) to the second state (e.g., "OFF", P2) when the switch 125 is pivoted or rotated in a downward direction (e.g., rotated in a direction from P1 to P2). In addition, the actuator 125a may be configured such that the second engagement surface 203 causes the AV switch 12 to move in the first direction from the second state ("P2") to the first state ("P1") when the switch 125 is pivoted or rotated in an upward direction (e.g., rotated in a direction from P1 to P2).

In yet further embodiments, the switch 125 includes an indicator for indicating a position of the rotatable member 125, for example, relative to the first position P1 and the second position P2. One or more markers or indicators may be provided on the front cover 120 to indicate the location of the first position P1 and/or the second position P2. Accordingly, a user can readily determine the state of the AV switch 12 based on the indicators on the first cover 120. In further embodiments, the switch 125 includes a stop member for preventing continued movement of the switch 125 in the first direction and/or the second direction. Although various embodiments relate to a switch for actuating the AV switch 12, in other embodiments, any one or more of the other features of the protective case 100 may be a switch for actuating a corresponding operator of the mobile electronic communication device.

In some embodiments, the switch 125 includes curved portions 125c. The curved portions 125c may be concave shaped (when viewed from outside of the protective case 100), and may curve inwards towards the AV switch 12 or actuator 125a of the mobile electronic communication device. The curved portions 125c are suitably thin or flexible (or both) to allow the switch 125 to freely pivot, but rigid enough to provide structural integrity and support. The curved portions 125c can provide stability and support for maintaining the actuator 125a in a particular position or state (e.g., a neutral state at which the actuator 125a does not move or change the state of the AV switch 12) when the actuator 125a is not manually manipulated, while also enhancing the ability of a user to grip and manual manipulate the actuator 125a and providing a seal to inhibit passage of moisture into the protective case 100. According to various embodiments, the a layer of flexible material 125b and the curved portions 125c may be made of any suitable flexible, resilient material, such as, but not limited to, thermoplastic polyurethane, and/or the like.

Figure 7A:
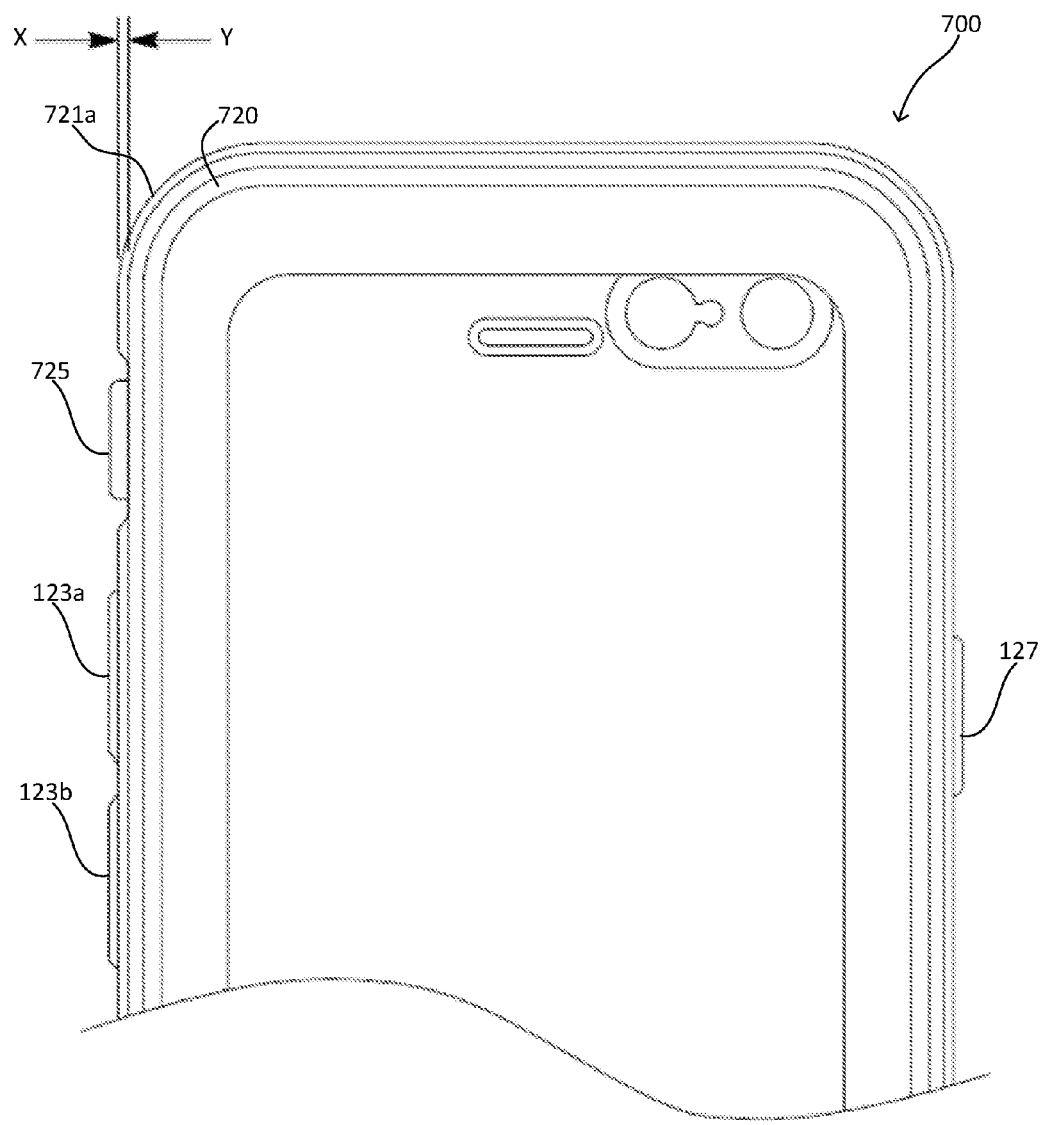
FIG. 7A is a view of a front cover of a protective case according to various embodiments.
Figure 7B:
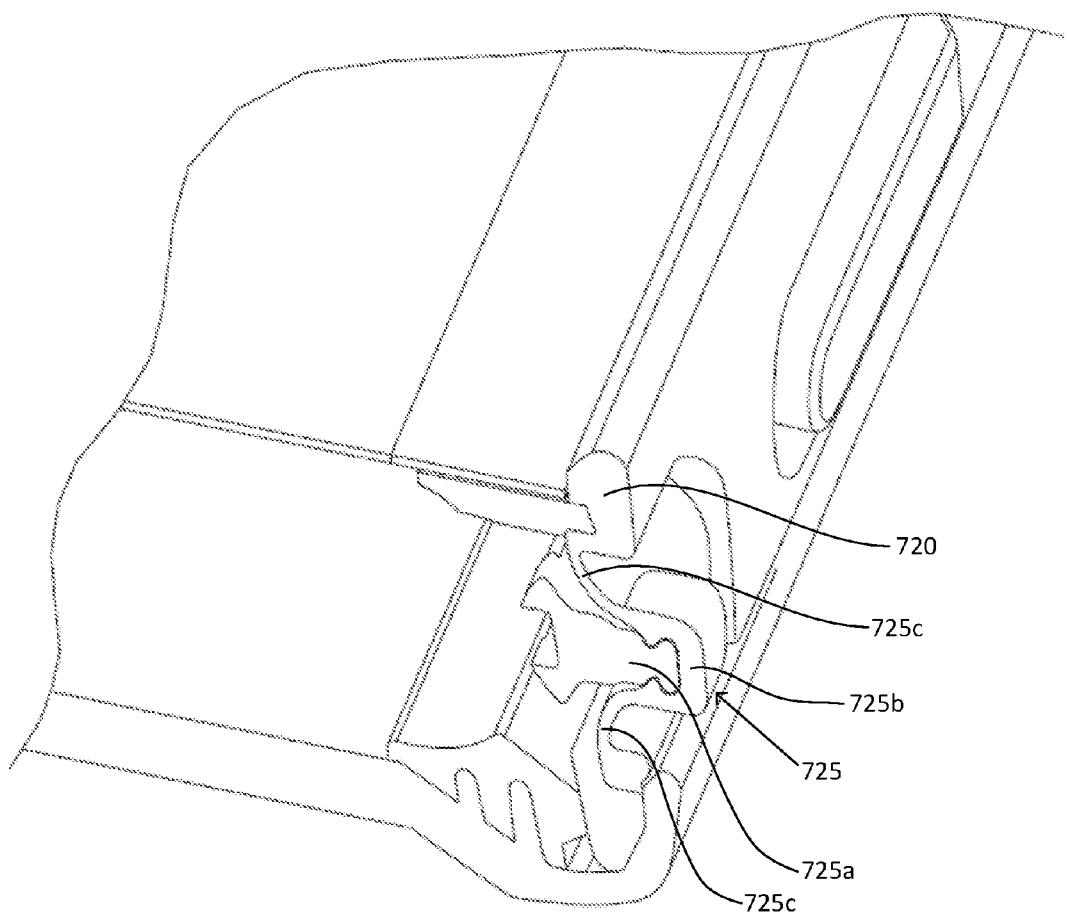
FIG. 7B is a cross-section view of a portion of a protective case according to various embodiments.

FIG. 7A is a view of a front cover of another protective case 700 according to various embodiments. FIG. 7B is a cross-section view of a portion of the protective case 700 according to various embodiments. Features described with respect to embodiments of FIGS. 7A and 7B can be employed in other embodiments including, but not limited to, embodiments described with respect to FIGS. 1-6B. Same reference numbers as those previously illustrated and introduced may correspond to the depiction and description of those reference numbers previously illustrated and previously described.

Referring to FIGS. 7A and 7B, in some embodiments, the protective case 700 includes at least one switch 725 configured to allow actuation of one or more switches of the mobile electronic communication device while the mobile electronic communication device is encased in the protective case 700. For example, the switch 725 may be similar in function and structure to the switch 125. In other embodiments, the switch 725 may have any other suitable configuration. The protective case 700 may further include a front cover 720 having an outer peripheral wall 721a, which may be similar or correspond to the outer peripheral wall 121a. The switch 725 may include an actuator 725a, which may be similar or correspond to the actuator 125a, and curved portions 725c, which may be similar or correspond to curved portions 125c. The curved portions 725c are suitably thin or flexible (or both) to allow the switch 125 to freely pivot, but rigid enough to provide structural integrity and support as described above with respect to curved portions 725c.

In some embodiments, the side of the protective case 700 on which the switch 725 is located has an outer peripheral wall 721a with an outer surface at a first level X. In particular embodiments, a recess of level Y from the outer surface level X is provided adjacent to the switch 725, toward the front and rear of the protective case 700, to improve manual access to the switch 725 from the front or rear of the protective case 700. With the switch 725 located within a recess from the outer surface X of the protective case, the switch 725 can be protected against accidental impact or actuation. In some embodiments, the actuator 725a may extend to a level not exceeding the second level Y. In other embodiments, the actuator 725a may extend to another level such as, by not limited to, a level not exceeding the first level X, or to a greater level. In some embodiments, a layer of flexible material 725b and the curved portions 725c may be formed by overmolding (e.g., over the inner surface of the outer peripheral body 721).

Figure 8:
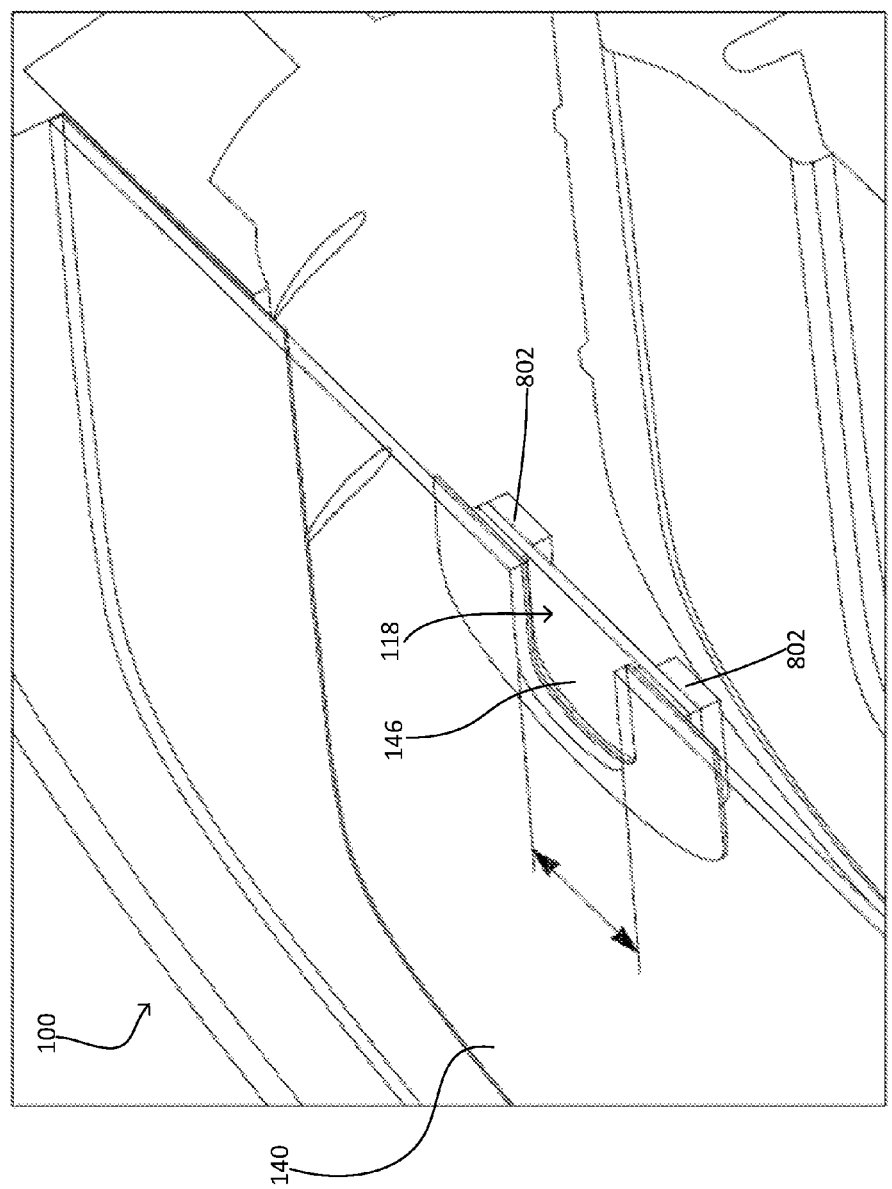
FIG. 8 is a cross-section view of a portion of a protective case according to various embodiments.

FIG. 8 is a cross-section view of a portion of a protective case 100 according to various embodiments. Features described with respect to the embodiment of FIG. 8 can be employed in other embodiments including, but not limited to, embodiments described with respect to FIGS. 1-7B. Same reference numbers as those previously illustrated and introduced may correspond to the depiction and description of those reference numbers previously illustrated and previously described.

Referring to FIG. 8, a cross-sectional view shows the aperture 118 in the front surface 140b of the membrane 140. The aperture 118 may be configured and located adjacent to (or otherwise in audio communication with) an audio device, such as, but not limited to, a speaker or a microphone of an encased mobile communication device, when the mobile communication device is located within the protective case 100. The aperture 118 may be covered or layered with the film 146. As discussed above, the membrane 140 may be a transparent membrane configured to allow a display screen of a mobile device to be seen through the membrane 140. The film 146 may be an audio vent, and may be attached to the membrane 140 in any suitable manner, such as, but not limited to, an adhesive tape, molding, glue, thermal bonding, or the like. In addition, the protective case 100 may further include a gasket 802 coupled to the film 146 and encircling the aperture 118. The gasket 802 may improve the acoustic quality of the sound emanating from the speaker of the mobile communication device by sealing and focusing the acoustics to the area encompassed by the gasket 802. In doing so, the gasket 804 may help prevent audio feedback and poor sound quality. In other embodiments, the gasket may be made from any other pliable material, such as, but not limited to, foam, liquid silicone rubber (LSR), microcellular urethane (e.g., PORON®), combinations thereof, and/or the like. In some embodiments, the gasket 802 is configured to contact a face of a mobile device when the mobile device is housing in the protective case 100. In other embodiments, the gasket 802 is configured to be spaced apart from the mobile device when the mobile device is housed in the protective case 100.

Accordingly, the protective case 100 may include a layered structure at the aperture 118 of the membrane 140. The layered structure may include the membrane 140 attached to the film 146, which is attached to the gasket 802. In other words, the layered structure at the aperture 118 includes the film 146 interposed between the membrane 140 and the gasket 802, such that the membrane 140 does not directly contact the gasket 802. In other embodiments, the film 118 is located over the membrane 140 (e.g., at the front surface 140b of the membrane 140), as opposed to being beneath the membrane 140 (e.g., at the rear surface 140a of the membrane 140). In such embodiments, the gasket 802 may be interposed between the membrane 140 and the film 148 over and above the membrane 140 (e.g., at the front surface 140b of the membrane 140). In some embodiments, the gasket 802 completely surrounds the aperture 118. In other embodiments, the gasket 802 partially surrounds the circumference of the aperture 118 (e.g., a first section of the gasket 802 is located along the top curve and a second section along the bottom curve of the aperture 118, with the two sections of the gasket 802 being unconnected). In some embodiments, the gasket 802 (fully or partially) encompasses the aperture 118 in an oval shape. In other embodiments, the gasket 802 encompasses the aperture 118 in any suitable shape, such as, but not limited to, a square shape, a diamond shape, or the like.

Figure 9A:
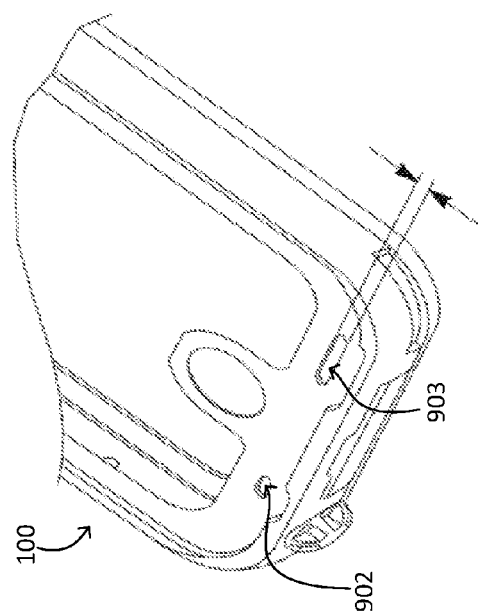
FIG. 9A is a perspective view of a portion of a protective case according to various embodiments.
Figure 9B:
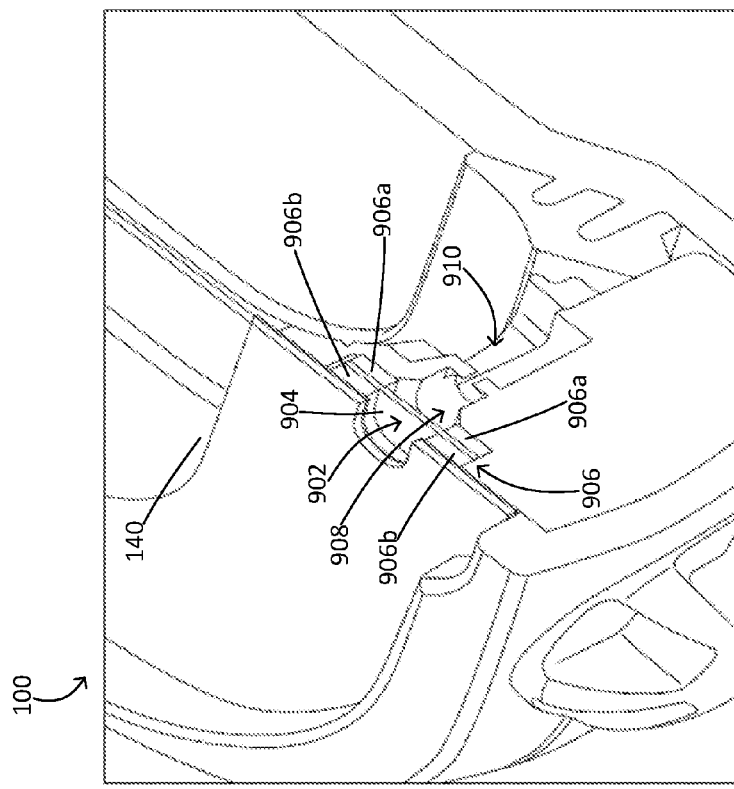
FIG. 9B is a cross-section view of a portion of a protective case according to various embodiments.
Figure 9C:
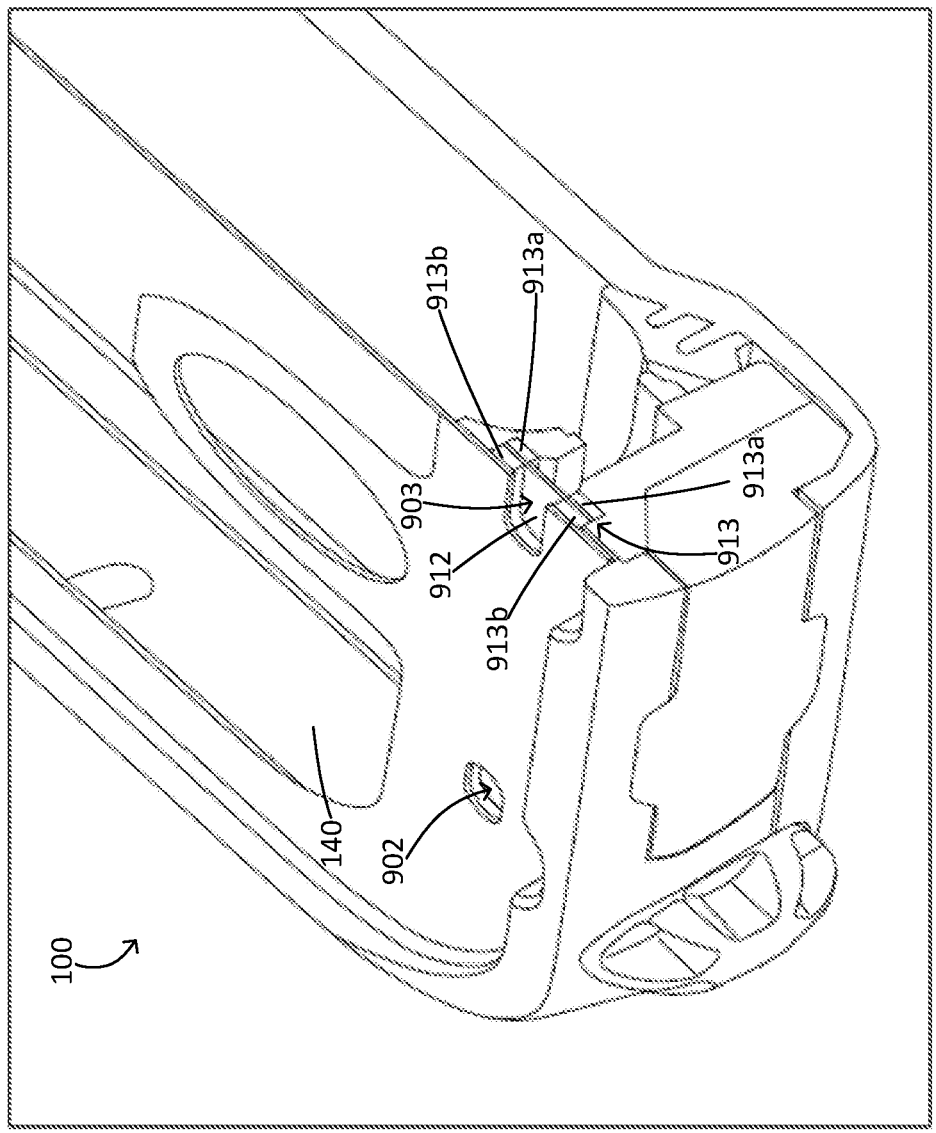
FIG. 9C is a cross-section view of a portion of a protective case according to various embodiments.

FIG. 9A is a perspective view of a portion of the protective case 100 according to various embodiments. FIG. 9B is a cross-section view of a portion of the protective case 100 according to various embodiments. FIG. 9C is a cross-section view of a portion of the protective case 100 according to various embodiments. Features described with respect to the embodiments of FIGS. 9A-9C can be employed in other embodiments including, but not limited to, embodiments described with respect to FIGS. 1-8. Same reference numbers as those previously illustrated and introduced may correspond to the depiction and description of those reference numbers previously illustrated and previously described.

Referring to FIGS. 9A, 9B, and 9C, the protective case 100 may further include a first bottom aperture 902 and a second bottom aperture 903. Each of the bottom apertures 902 and 903 may correspond to locations of a speaker or microphone of an encased mobile communication device for allowing sound to enter and/or exit the protective case 100.

Referring to FIG. 9B, a cross-sectional view focused on the first bottom aperture 902 is depicted. The protective case 100 at the first bottom aperture 902 includes a film 904 and a gasket structure 906. The film 904 may correspond to the film 146. The gasket structure 906 includes a first gasket 906a and a second gasket 906b. The first and second gaskets 906a and 906b may correspond to the gasket 802, discussed above. The gasket structure 906 separates the film 904 from the film 146. In some embodiments, the film 904 may be interposed between the first and second gaskets 906a and 906b of the gasket structure 906. The second gasket 906b of the gasket structure 906 is located proximate an encased mobile communication device and the first gasket 906a of the gasket structure 906 is located proximate the membrane 140. Accordingly, in some embodiments, the film 904 is completely sandwiched along its circumference between two rings formed by the first and second gaskets 906a and 906b. In other embodiments, the circumference of the film 904 is partially interposed between the two rings (e.g., portions of the circumference of the film 904 are not covered by the gasket structure 906). The top ring formed of the second gasket 906b may be attached to the membrane 140, and the bottom ring formed of the first gasket 906a, or a portion thereof, may be attached to structure on the inside of the protective case 100.

Accordingly, the protective case 100 may include a layered structure at the first bottom aperture 902 of the membrane 140. The layered structure may include the second gasket 906b attached to the membrane 140, a film 904 attached to the second gasket 906b, and the first gasket 906a attached to the film 904. In other words, the layered structure at the aperture 902 includes the film 904 interposed between the first gasket 906a and the second gasket 906b, such that the membrane 140 does not directly contact or directly attach to the film 904. The separation of the film 904 from the membrane 140 by the gasket structure 906, can inhibit communication of vibrations (audio or otherwise) between the membrane 140 and the film 904 and, thus, can improve audio quality of sound passing through the aperture 902 in the protective case 100.

In some embodiments, a small chamber 908 is located directly beneath the film 902. The small chamber 908 may be an open cavity within the protective case and may provide a pathway for sound originating from the encased mobile device to be transmitted to outside of the protective case 100, or for sound originating from outside the protective case 100 to propagate into the encased mobile device. The small chamber 908 may be define by having borders including the film 904, the inner wall of the protective case 100, and a mobile device when the mobile device is housed within the protective case 100. Beneath the small chamber 908, the interior of the protective case 100 may open into a large chamber 910, in which a mobile device may be housed. As such, the combination of the small chamber 908 and the large chamber 910 may provide a pathway for sound to be communicated or directed to and/or from the encased mobile device to provide improved sound quality transmission or sound quality reception.

Referring to FIG. 9C, a cross-sectional view focused on the second bottom aperture 903 is depicted. In some embodiments, the protective case 100 at the second bottom aperture 903 includes a film 912 and a gasket 913 that constitute the layered structure, similar to the layered structure depicted in FIG. 9B. The film 912 may correspond to the film 904 and the gasket 913, having a bottom ring 913*a* and a top ring 913*b*, may correspond to the gasket structure 906, having the first gasket 906*a* and the second gasket 906*b*. In some embodiments, the first bottom aperture 902 corresponds to a location of a microphone of the encased mobile communication device, and the second bottom aperture 903 corresponds to a location of a speaker of the encased mobile communication device, or vice versa. In one embodiment, each of the first and second bottom apertures 902 and 903 corresponds to microphones of the mobile device when the mobile device is encased in the protective case 100, and in another embodiment, each of the first and second bottom apertures 902 and 903 correspond to speakers of the mobile device.

Figure 10A:
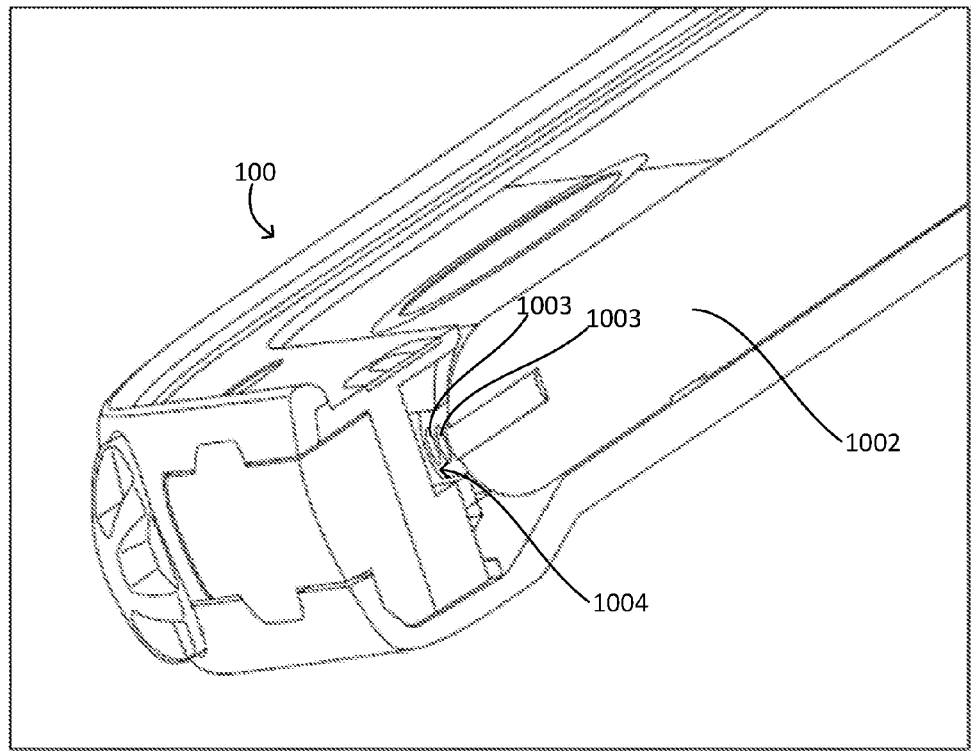
FIG. 10A is a perspective cross-sectional view of a portion of a protective case according to various embodiments.
Figure 10B:
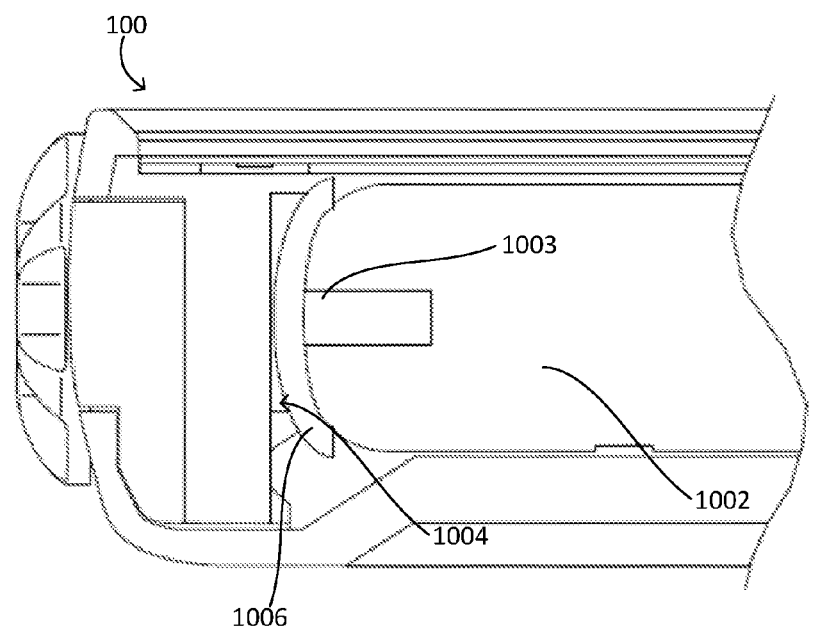
FIG. 10B is a side cross-sectional view of a portion of a protective case according to various embodiments.
Figure 10C:
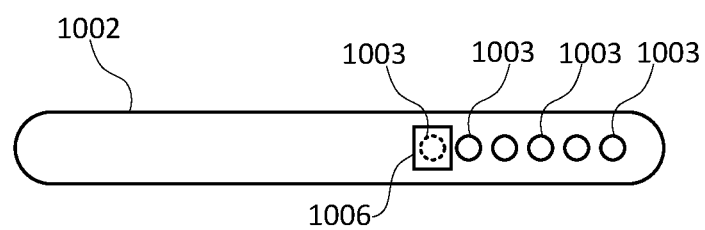
FIG. 10C is a cross-sectional view of a lateral portion of a protective case housing a mobile electronic communication device.

FIG. 10A is a perspective cross-sectional view of a portion of the protective case 100 according to various embodiments. FIG. 10B is a side cross-sectional view of a portion of the protective case 100 according to various embodiments. FIG. 10C is a cross-sectional view of a lateral portion of a protective case housing a mobile electronic communication device. Features described with respect to the embodiments of FIGS. 10A-10C can be employed in other embodiments including, but not limited to, embodiments described with respect to FIGS. 1-9C. Same reference numbers as those previously illustrated and introduced may correspond to the depiction and description of those reference numbers previously illustrated and previously described.

Referring to FIG. 10A, the protective case 100 may house or encase a mobile device 1002. In some embodiments, the mobile device 1002 includes a plurality of sound apertures 1003 for transmitting or receiving sound from or to the mobile device 1002. In some embodiments, one or more of the sound apertures 1003 may be microphones for receiving sound and transmitting the sound to the mobile device 1002. In other embodiments, one or more of the sound apertures 1003 are speakers for transmitting sound from the mobile device 1002 to the outside. In some embodiments, the sound apertures 1003 are directed toward an acoustic chamber 1004 of the protective case 100 such that the sound emitted from the sound apertures 1003 is funneled to outside of the protective case 100 (e.g., via the second bottom aperture 903).

Referring to FIG. 10B, in some embodiments, the protective case 100 includes one or more gaskets 1006 located directly in front of one or more of the speaker apertures 1003 such that the gasket 1006 covers or seals (e.g., acoustically seals) the sound aperture 1003 and muffles the sound emitted from the covered one or more sound apertures 1003 or blocks outside sound from entering the covered sound aperture 1003. The gasket 1003 may correspond to the gasket 802. In some embodiments, the gasket 1006 covers one sound aperture 1006. In other embodiments, the gasket 1006 covers a plurality of sound apertures 1006.

In some embodiments, the gasket 1006 covers one or more sound apertures 1003 that are microphones such that sound is prevented from entering the microphone sound apertures 1003, while the other sound apertures 1003 remain uncovered. In further embodiments, the uncovered sound apertures 1003 are speakers that emit sound. In other embodiments, the gasket 1006 covers one or more sound apertures 1003 that are speakers such that sound is prevented from exiting the speaker sound apertures 1003 to the outside, while the other sound apertures 1003 remain uncovered. In further embodiments, these uncovered sound apertures 1003 are microphones that receive sound. In embodiments in which the gasket 1006 acoustically seals one or more microphones adjacent one or more speakers, sound reception quality of the mobile device 1002 may be improved because the acoustically sealed microphones will no longer receive noise or interference from the adjacent one or more speakers.

Referring to FIG. 10C, the diagram shows an edge of the mobile device 1002 and the location of the gasket 1006 when the phone is housed in the protective case 100. In some embodiments, the gasket 1006 may cover or acoustically seal one of the sound apertures 1003 from transmitting or receiving sound. In some embodiments, the gasket 1006 may cover a left-most sound aperture 1003. In other embodiments, the gasket 1006 may cover any one or more of the sound apertures 1003 for enhancing audio quality of the mobile device 1002.

In some embodiments, the gasket 1006 is of a size and shape to suitably cover one or more of the sound apertures 1003 of the mobile device 1002, such as, but not limited to, a square, a rectangle, a diamond, a circle, and so on. In some embodiments, the gasket 1006 is attached to the inside of the protective case 100. For example, the gasket 1006 may be attached to the overmolding at the inside of the protective case 100. In other embodiments, the gasket 1006 is separated or spaced apart from the inner wall of the protective case 100. In some embodiments, the gasket 1006 is separated (detached) from the acoustic vents of the protective case 100 (e.g., films 904 and/or 912). In some embodiments, the gasket 1006 is a continuous strip of material. In other embodiments, the gasket 1006 includes a plurality of discrete strips of material at one or more of the sound apertures 1003.

It is to be understood that although particular embodiments of the protective case 100, 600, 700 are for encasing a mobile electronic communication device, the object to be housed in the protective case 100, 600, 700 may be any of a number of different objects. In addition, it should be noted that the protective case 100, 600, 700 may have a number of different suitable shapes, sizes, and configurations. For instance, in some embodiments, the protective case 100, 600, 700 may include two separate members (e.g., separate individual front and rear covers 110, 120) that are configured for being removably coupled together to surround the mobile electronic communication device and thereby enclose the mobile electronic communication device. In other embodiments, the rear and front covers 110, 120 may not be separate members, but rather may be members that are joined, for instance, by a common hinge element, or a single member configured for being folded upon itself and thereby forming the housing.

It is to be understood that although particular embodiments of the protective case 100, 600, 700 are for encasing a mobile electronic communication device, the object to be housed in the protective case 100, 600, 700 may be any of a number of different objects. In addition, it should be noted that the protective case 100, 600, 700 may have a number of different suitable shapes, sizes, and configurations. For instance, in some embodiments, the protective case 100, 600, 700 may include two separate members (e.g., separate individual front and rear covers 110, 120) that are configured for being removably coupled together to surround the mobile electronic communication device and thereby enclose the mobile electronic communication device. In other embodiments, the rear and front covers 110, 120 may not be separate members, but rather may be members that are joined, for instance, by a common hinge element, or a single member configured for being folded upon itself and thereby forming the housing.

In other embodiments, the mobile electronic communication device is received in the rear cover 110 instead of the front cover 120. In particular embodiments, the membrane 140 is attached directly to the front cover 120. The mobile electronic communication device, for example, may be received into a cavity defined by the rear cover 110 to position the back surface of the mobile electronic communication device with the bottom surface of the rear cover 110. In some embodiments, the membrane 140 forms a flush, front surface of the protective case 100. That is, the front surface of the protective case 100 is the uppermost surface of the protective case 100.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, and their equivalents, rather than the embodiments. Various modifications and changes that come within the meaning and range of equivalency of the claims are intended to be within the scope of the invention.

What is claimed is:

1. A protective case for a mobile electronic communication device, the protective case comprising:
   a rear cover comprising a compressible member and a catch, the compressible member and the catch being spaced from each other to form an alcove; and
   a front cover comprising a rim configured to extend into the alcove, the rim having an inner surface configured to contact the compressible member and an outer surface facing opposite the inner surface configured to engage the catch and couple the rear cover and the front cover together;
   wherein the rear cover and the front cover form an interior for containing a mobile electronic communication device when the rear cover and the front cover are coupled together, and wherein the inner surface of the rim faces toward the interior of the protective case when the rear cover and the front cover are coupled together.

2. The protective case of claim 1, wherein the compressible member is made from liquid silicone rubber.

3. The protective case of claim 1, wherein the compressible member is located at least partially between the rim of the front cover and the interior of the protective case when the rear cover and the front cover are coupled together.

4. The protective case of claim 1, wherein the compressible member comprises a projection portion that extends at least partially into the alcove and toward the inner surface of the rim of the front cover when the rear cover and the front cover are coupled together.

5. A protective case for a mobile electronic communication device, the protective case comprising:
   a rear cover comprising a compressible member and a catch, the compressible member and the catch being spaced from each other to form an alcove; and
   a front cover comprising a rim configured to extend into the alcove, the rim having an inner surface configured to contact the compressible member and an outer surface opposite the inner surface configured to engage the catch;
   wherein the compressible member comprises an enlarged portion and a projection portion extending from the enlarged portion and into the alcove.

6. The protective case of claim 5, wherein the inner surface of the rim is configured to compress the projection portion of the compressible member when the rear cover is coupled to the front cover.

7. The protective case of claim 6, wherein the enlarged portion of the compressible member is configured to increase in thickness when the projection portion is compressed by the inner surface of the rim.

8. The protective case of claim 7, further comprising one or more empty spaces above and/or below the compressible member when the front cover is coupled to the rear cover, the empty spaces configured to accommodate the increased thickness of the enlarged portion of the compressible member.

9. A protective case for a mobile electronic communication device, the protective case comprising:
   a rear cover comprising a compressible member and a catch, the compressible member and the catch being spaced from each other to form an alcove; and
   a front cover comprising a rim configured to extend into the alcove, the rim having an inner surface configured to contact the compressible member and an outer surface opposite the inner surface configured to engage the catch;
   wherein:
   the rear cover has an inclined surface; and
   the compressible member is located on the inclined surface such that the compressible member is directed towards the alcove.

10. A method of manufacturing a protective case for a mobile electronic communication device, the method comprising:
    providing a rear cover comprising a compressible member and a catch, the compressible member and the catch being spaced from each other to form an alcove; and
    configuring a front cover with a rim that extends into the alcove when the rear cover and the front cover are coupled together, the rim having an inner surface configured to contact the compressible member and an outer surface facing opposite the inner surface, the outer surface of the rim configured to engage the catch and couple the rear cover and the front cover together to form an interior for containing a mobile electronic communication device;
    wherein the inner surface of the rim faces toward the interior of the protective case when the rear cover and the front cover are coupled.

11. The method of claim 10, wherein the outer surface of the rim has an angular recess.

12. The method of claim 11, wherein a shape of the catch corresponds to the angular recess of the outer surface of the rim for engagement between the catch and the angular recess.

13. The method of claim 11, wherein the inner surface of the rim has a flat surface.

14. The method of claim 10, wherein the compressible member comprises an enlarged portion and a projection portion extending from the enlarged portion and into the alcove.

15. The method of claim 14, wherein the inner surface of the rim is configured to compress the projection portion of the compressible member when the rear cover is coupled to the front cover.

16. The method of claim 15, wherein the enlarged portion of the compressible member is configured to increase in thickness when the projection portion is compressed by the inner surface of the rim.

17. The method of claim 16, further comprising providing one or more empty spaces above and/or below the compressible member when the front cover is coupled to the rear cover, the empty spaces configured to accommodate the increased thickness of the enlarged portion of the compressible member.

18. The method of claim 10, wherein the compressible member is made from liquid silicone rubber.

19. A method of manufacturing a protective case for a mobile electronic communication device, the method comprising:
providing a rear cover comprising a compressible member and a catch, the compressible member and the catch being spaced from each other to form an alcove; and
configuring a front cover comprising a rim configured to extend into the alcove, the rim having an inner surface configured to contact the compressible member and an outer surface opposite the inner surface configured to engage the catch;
wherein the rear cover has an inclined surface; and
wherein the compressible member is located on the inclined surface such that the compressible member is directed towards the alcove.

20. A protective case for a mobile electronic communication device, the protective case comprising:
an outer peripheral wall along a perimeter of the protective case; and
a switch attached to an inner surface of the outer peripheral wall, the switch comprising a layer of flexible material adhered to the inner surface of the outer peripheral wall and forming a recess, and an actuator configured as a separate element relative to the layer of flexible material, the actuator being received within the recess, the actuator having an engagement surface that is arranged to engage a switch of the mobile electronic communication device when the mobile electronic communication device is received in the protective case.

21. The protective case of claim 20, the actuator is made of a different material relative to the flexible material of the switch.

22. The protective case of claim 20, wherein the flexible material of the switch is overmolded to the outer peripheral wall.

23. The protective case of claim 20, wherein the flexible material of the switch comprises at least one curved portion extending between the recess in which the actuator is received and the outer peripheral wall.

24. A protective case for a mobile electronic communication device, the protective case comprising an acoustic film that inhibits passage of water and allows passage of sound, and one or more gaskets located adjacent one or more corresponding sound apertures of the mobile electronic communication device when the mobile electronic communication device is housed in the protective case, the one or more gaskets arranged between the acoustic film and the mobile electronic communication device and configured to acoustically seal the one or more corresponding sound apertures of the mobile electronic communication device when the mobile electronic communication device is housed in the protective case.

25. The protective case of claim 24, wherein the one or more gaskets are configured to contact a surface of the mobile electronic communication device and seal one or more of the sound apertures when the mobile electronic communication device is housed in the protective case.

26. The protective case of claim 24, wherein the one or more gaskets are made from a foam material.

27. The protective case of claim 24, wherein the one or more sound apertures sealed by the one or more gaskets are microphones of the mobile device.

28. The protective case of claim 24, further comprising an outer wall, the one or more gaskets being attached to an inside surface of the outer wall.

29. The protective case of claim 24, further comprising a cover member having an outer wall and a membrane that allows access to a user input interface of a mobile electronic communication device when the electronic communication device is housed in the protective case, the one or more gaskets being attached to a surface of the membrane and located between the membrane and the mobile electronic communication device when the electronic communication device is housed in the protective case.

* * * * *